United States Patent [19]

Best Available Copy

[11] E

Re. 28,588

Sizer et al.

[45] Reissued Oct. 28, 1975

[54] WELL CROSS-OVER APPARATUS FOR SELECTIVE COMMUNICATION OF FLOW PASSAGES IN A WELL INSTALLATION

[75] Inventors: Phillip S. Sizer; Albert W. Carroll, both of Dallas, Tex.

[73] Assignee: Otis Engineering Corporation, Dallas, Tex.

[22] Filed: Mar. 14, 1974

[21] Appl. No.: 451,005

Related U.S. Patent Documents

Reissue of:

[64] Patent No.: 3,666,012
Issued: May 30, 1972
Appl. No.: 91,751
Filed: Nov. 23, 1970

[52] U.S. Cl. ..... 166/224 R; 166/313
[51] Int. Cl.[2] ..... E21B 33/00
[58] Field of Search..... 166/313, 189, 224 R, 224 A

[56] References Cited

UNITED STATES PATENTS

| | | | |
|---|---|---|---|
| 2,726,723 | 12/1955 | Wilhoit et al. | 166/224 |
| 3,381,753 | 5/1968 | Fredd | 166/189 |
| 3,441,084 | 4/1969 | Fredd | 166/189 |
| 3,494,420 | 2/1970 | Sizer | 166/313 |
| 3,533,430 | 10/1970 | Fredd | 166/224 |
| 3,552,491 | 1/1971 | Thompson | 166/313 |
| 3,554,281 | 1/1971 | Ecuer | 166/224 |
| 3,606,584 | 9/1971 | Sizer | 166/313 |
| 3,680,637 | 8/1972 | Raulins | 166/313 |

*Primary Examiner*—James A. Leppink
*Attorney, Agent, or Firm*—Joe E. Edwards, Esq.; M. H. Gay, Esq.; Jack R. Springgate, Esq.

[57] ABSTRACT

A well flow system, including one or more flow conductors disposed in a well having a casing annulus, means interconnecting the conductor or conductors and/or annulus, and a fluid-actuated valve in at least one of the flow conductors for selectively communicating the conductor or conductors and/or the annulus of the well responsive to a pressure differential applied across the valve and controlled from the surface. The flow system is adapted to well producing and well treating procedures. A number of different flow conductor, well annulus and valve arrangements are shown with provision in each system disclosed for hydraulic control of a downhole valve to communicate selected combinations of flow passages of the conductors and the well annulus.

25 Claims, 32 Drawing Figures

INVENTORS
Phillip S. Sizer
BY Albert W. Carroll
W. Mathews Garland
ATTORNEY

INVENTORS
Phillip S. Sizer
BY Albert W. Carroll
W. Matthew Garland
ATTORNEY

INVENTORS
Phillip S. Sizer
Albert W. Carroll
BY W. Matthew Garland
ATTORNEY

INVENTORS
Phillip S. Sizer
Albert W. Carroll
BY W. Mathews Garland
ATTORNEY

INVENTORS
Phillip S. Sizer
BY Albert W. Carroll
W. Matthew Garland
ATTORNEY

INVENTORS
Phillip S. Sizer
BY Albert W. Carroll
W. Mathews Garland
ATTORNEY

INVENTORS
Phillip S. Sizer
Albert W. Carroll
BY W. Matthews Garland
ATTORNEY

INVENTORS
Phillip S. Sizer
BY Albert W. Carroll
W. Matheson Garland
ATTORNEY

INVENTORS
Phillip S. Sizer
BY Albert. W. Carroll
W. Mathew Garland
ATTORNEY

INVENTORS
Phillip S. Sizer
BY Alfred W. Carroll
W. Matthew Garland
ATTORNEY

INVENTORS
Phillip S. Sizer
Albert W. Carroll

BY W. Matthews Garland

ATTORNEY

WELL CROSS-OVER APPARATUS FOR SELECTIVE COMMUNICATION OF FLOW PASSAGES IN A WELL INSTALLATION

Matter enclosed in heavy brackets [ ] appears in the original patent but forms no part of this reissue specification; matter printed in italics indicates the additions made by reissue.

---

This invention relates to well tools, and more particularly relates to well flow systems for remote hydraulic control of flow in passages in a well bore.

More and more, sought-after earth fluids, such as oil and gas, become increasingly difficult to find and produce and, when found, are often in remote, physically inaccessible locations. One preferred approach to a solution to the more trying circumstances of such problems resides in a well flow system which is remotely controllable and which may include means for fluid transport of some of the control mechanism employed, such as the fluid operated valves to and from the downhole equipment from the surface. Accordingly, it is a particularly important object of the invention to provide a new and improved well flow system for flow control between selected flow paths in a well.

It is another object of the invention to provide a well flow control system which is manipulated from the surface by fluid pressure means.

It is another object of the invention to provide a well system in which control valves may be pumped to and from operating locations in a well.

It is a further object of the invention to provide a well flow control system including valve means which are opened and closed responsive to fluid pressure differentials applied within a well bore between selected flow passages in the bore.

It is another object of the invention to provide a well flow control system in which fluid communication is controllable through at least one flow conductor in the well above a packer and a portion of the flow conductor communicating with a producing formation around the well below the packer.

It is another object of the invention to provide a well flow system which includes at least one flow conductor for producing well fluids from a well bore and at least one other flow passage selectively communicated with the flow conductor for applying a pressure differential to valve means in the flow conductor for controlling the function of such valve means.

It is still another object of the invention to provide a well flow system including a plurality of flow passages defined by a flow conductor communicating through a valve to a packed-off producing formation, a flow conductor extending to such valve for use in controlling such valve, and a flow conductor connected with an annulus portion in the bore of the well isolated from the producing formation.

It is still another object of the invention to provide a well flow system including a flow conductor communicating through a valve to a packed-off producing formation, such flow conductor also communicating through the valve to an annulus in the well bore isolated from the producing formation, and a flow conductor connected with the annulus for pressure control of the valve by adjustment of a pressure differential between the first flow conductor and the annulus.

It is still another object of the invention to provide a well flow system including at least two flow conductors in a well bore communicating with each other through a fluid pressure controllable valve and communicating through such valve with the annulus of the well and including a flow conductor communicating with the annulus whereby a pressure differential may be applied at the valve between either of the flow conductors communicating and between the annulus and the flow conductor.

It is still another object of the invention to provide a well flow system including at least two flow conductors one of which includes a pressure controllable valve through which such conductor communicates with the other flow conductor, both of such conductors communicating with the well bore below such valve and another flow conductor communicating with the annulus of the well bore around the first two mentioned flow conductors.

It is still another object of the invention to provide a well flow system including at least two flow conductors one of which has a fluid operated valve with a bypass around such valve, the valve isolating the flow conductors from each other at one position and at another position communicating the flow conductors while shutting off a portion of one conductor below the valve.

It is still another object of the invention to provide a well flow system including at least two flow conductors interconnected through a fluid-actuated valve, the flow conductor in which the valve is positioned having a bypass around the valve, the portion of such flow conductor communicating from above the valve through the valve with the other flow conductor, while the portion of such flow conductor below the valve is isolated from the other flow conductor, the valve being operable responsive to a differential pressure between the flow conductors.

It is another object of the invention to provide a well system having first and second flow conductors, a cross-over between the conductors, and a valve in the first flow conductor isolating the conductors at one position and communicating the conductors at another position while shutting off the first conductor below the valve, the casing being isolated at all times, the valve functioning responsive to a casing-first conductor pressure differential.

It is another object of the invention to provide a well flow system having interconnected first and second flow conductors communicating through a valve in the first flow conductor and having a bypass along such first flow conductor around the valve, the valve being operable responsive to a pressure differential between the casing annulus pressure and pressure in the first flow conductor, the flow conductors being isolated from each other and from the casing at one valve position, and the second of the flow conductors being communicated with the casing annulus and the lower portion of the first conductor isolated at a second valve position.

It is still another object of the invention to provide a well flow system including at least a pair of interconnected flow conductors with a fluid-actuated valve in the first of such flow conductors and a bypass in such conductor around the valve, the valve isolating the flow conductors from each other at one valve position while the portion of the first flow conductor above the valve is communicated through the valve with the casing annulus and the portion of the first conductor below the valve is isolated at a second valve position.

It is still another object of the invention to provide a well flow system including at least a pair of interconnected flow conductors, a first of such flow conductors including a fluid-actuated valve and having a bypass around such valve, the flow conductors being isolated from each other at a first valve position, the casing annulus being isolated at all times, and the valve being moved to a second position responsive to casing pressure to communicate the flow conductors and isolate the portion of the first flow conductor below the valve.

It is still another object of the invention to provide a well flow system having at least a pair of flow conductors interconnected, the first of such conductors having a casing pressure responsive fluid-operated valve and a bypass around the valve, the casing annulus, the first flow conductor above the valve, and the second flow conductor being simultaneously communicated through the valve while the first flow conductor below the valve is isolated from the casing annulus and the second flow conductor.

It is still another object of the invention to provide a well flow system having at least a pair of flow conductors interconnected through a fluid operated valve disposed in a first of the flow conductors and including a sliding sleeve valve disposed in the second of the flow conductors for isolating the two flow conductors at the valve from each other, the first of the flow conductors having bypass flow passages around the valve, the flow conductors above the valve being communicated with each other when the valve is at a lower position with the lower portion of the first flow conductor below the valve being isolated, and the flow conductors being fully isolated from each other when the valve is in an up position.

It is still another object of the invention to provide a well flow system having at least two flow conductors interconnected through a fluid-operated valve disposed in one of the flow conductors, each of the flow conductors having landing and locking recess means for placing a valve in either of the flow conductors at a cross-over connection between them, each of the flow conductors having a bypass around the landing means for bypassing the valve when placed in either of the flow conductors, the valve being adapted to permit communication between the two flow conductors while isolating the portion of the flow conductor containing the valve below the valve from the upper portion of such flow conductor and from the other flow conductor, the valve being operable responsive to a pressure differential between the flow conductors, and the flow conductors being isolated from the casing annulus.

It is another object of the invention to provide a well system having first and second flow passages, a valve in the first passage for isolating the passages at a first valve position while allowing flow along the first passage and for communicating the passages at a second valve position responsive to a pressure exterior of the first passage while isolating the first passage below the valve.

It is another object of the invention to provide a well valve arrangement for use in a well flow control system which includes a side-pocket type landing nipple in one flow conductor connected through a cross-over flow passage with another flow conductor whereby a valve in the side pocket controls communication between the flow conductors.

It is another object of the invention to provide a valve arrangement for a well system including a pair of laterally spaced side-pocket type landing nipples included in first and second flow conductors and connected by a cross-over passage whereby a flow control valve may be disposed in the side pocket of either of the landing nipples for controlling fluid communication between the flow conductors.

It is another object of the invention to provide a well arrangement including side-pocket landing nipples in spaced tubing strings arranged in an over-under nested relationship and interconnected by a flow tube for communicating the tubing strings with each other through the side pockets whereby a valve disposed in either of the side pockets selectively controls communication between the tubing strings through the side pockets.

It is another object of the invention to provide a body member for use with laterally spaced tubing strings and including a side-pocket type landing nipple along one side of the body and a longitudinal flow passage along the other side communicated with the landing nipple at the side pocket by a lateral flow passage for selectively communicating the tubing strings connected with the body by means of a flow control valve disposed in the side pocket.

It is another object of the invention to provide a body member having a pair of laterally spaced side-pocket type landing nipples formed therein and a cross-over flow passage communicating the nipples at the side pockets whereby fluid flow is controllable between the spaced landing nipples by a valve placed in either of the side pockets for selectively communicating parallel tubing strings connected with the body.

These and further objects of the invention will be apparent from reading the following description of preferred embodiments of the invention taken in conjunction with the accompanying drawings wherein.

Figure 31:
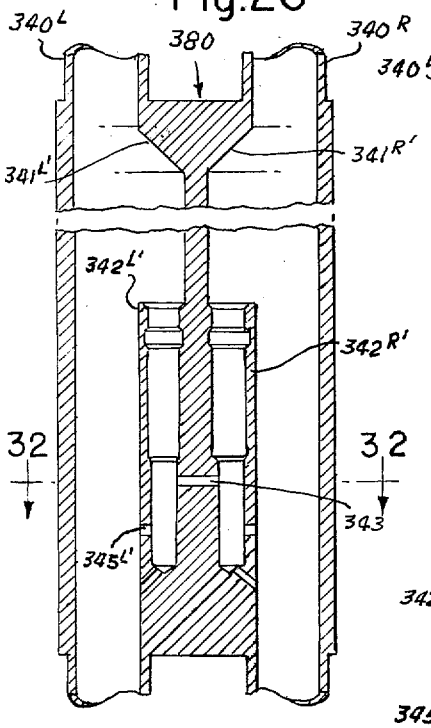
Figure 32:
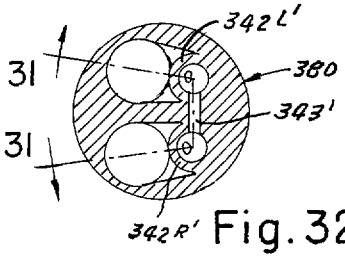

FIG. 31 is a broken fragmentary longitudinal view in section along the line 31—31 of FIG. 32 of another unitary body structure for use with parallel tubing strings in a well and including a side-by-side arrangement of interconnected side-pocket type landing nipples; and FIG. 32 is a cross-sectional view along the line 32—32 of FIG. 31 showing the actual side-by-side positions of the two landing nipples of FIG. 31.

In accordance with the invention, a number of forms of a well system embodying the invention are provided for well production and servicing. In its broadest concept the well system has a flow conductor defining a first flow passage for well fluids flow and for well service fludis flow at separate selected times. One or more other flow passages are provided in the well system. At least two of the flow passages communicate through a valve operable in the first flow passage. At a first valve position such two passages are isolated from each other while flow is permitted to the surface through at least the first passage from below the valve. At a second valve position two of the flow passages communicate with each other. The pressure in the first flow passage is normally above the other flow passage pressures to which the valve is exposed. The valve is moved from a first to a second position responsive to an increase in pressure from exterior of the first flow passage. At the second valve position various well servicing procedures are carried out.

Figure 1:
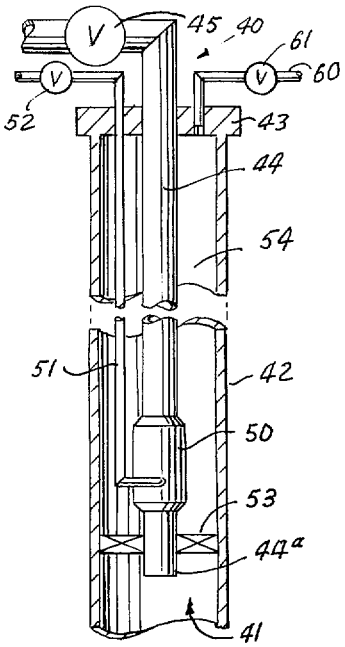
FIG. 1 is a fragmentary schematic view in longitudinal section of a well having a flow system in accordance with the invention.

Referring to FIG. 1, a well system 40 includes a well 41 having a well casing 42 provided with a surface well head 43. A flow conductor 44 is supported in the well for producing well fluids and for introducing fluids into the well during treatment procedures. The flow conductor includes a surface control valve 45. A downhole valve 50 is included in the flow conductor for controlling flow through the conductor to the surface and for providing one leg of a closed circuit flow path above the valve for tool pumping and well servicing purposes. A fluid control line 51 having a surface valve 52 is connected through the well head into the valve 50 for fluid pressure control of the valve 50 and to provide a return flow path to the surface for certain well servicing and tool pumping functions. A suitable well packer 53 seals around the flow conductor within the casing below the valve 50 defining with the flow conductor and casing an upper well annulus 54 and a lower well fluids producing portion 55. A line 60 having a valve 61 is connected through the well head into the annulus 54 for fluid flow to and from the annulus for various well control and servicing purposes.

Figure 5:
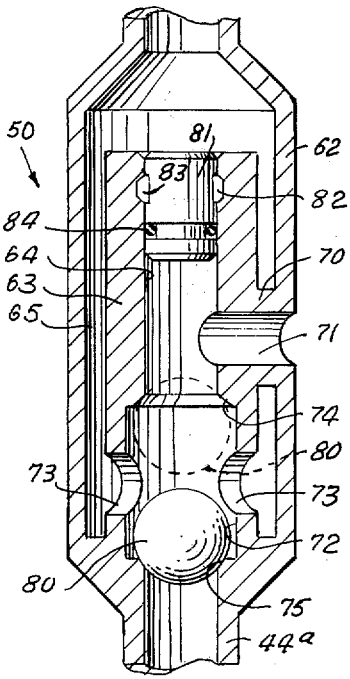
FIG. 5 is a fragmentary view in longitudinal section of one form of valve which may be used in the well systems of FIGS. 1–4 for flow control between the flow passages defined in the well systems.

The valve 50 as shown in greater detail in FIG. 5 includes a housing 62 which may be formed integral with a section of the flow conductor 44 or may be provided with connection means, such as threads at opposite ends, not shown, so that the valve may be installed in any suitable location along the length of the flow conductor 44 by threadedly engaging the housing between adjacent sections of the conductor. The valve has an internal concentrically disposed cylindrical body 63 provided with a longitudinal bore 64. The body 63 is inwardly spaced in the valve housing 50 defining an annulus 65 extending substantially the length of the valve between the body and housing. The annulus 65 is closed at the lower end and open to the conductor 44 t the upper end. The body 63 is connected by short onduit portion 70 to the housing 62 defining a flow assage or side port 71 from exterior of the valve housing into the central bore 64. In the well system 40, the ontrol [in] *line* 51 is connected into the side port 1. The bore 64 is enlarged along a lower portion 72 long which the body 63 is provided with side ports 73 ommunicating the central bore of the valve with the nnulus 65 so that fluid may flow from the flow conductor below the valve through the valve into the flow onductor above the valve. Upper and lower valve eats 74 and 75, respectively, are formed in the valve ody 63 at the opposite ends of the central bore portion 2 to receive a ball valve 80 which is movable between he upper and lower positions illustrated in FIG. 5. A emovable plug 81 is locked in the upper end portion f the bore 64 by locking dogs 82 which engage an inernal annular locking recess in the body 63 around the ore 64. A ring seal 84 supported on the plug 81 seals round the plug with the wall of the bore 64. It will be pparent that the body 63 could be fabricated with a olid closure at the upper end of the bore 64 to perform he same function as the plug 81 so that fluids in the ore 64 are directed to the side port 71 of the valve. At he lower position of the ball valve 80 shown in solid ines in FIG. 5 no flow may occur through the valve downwardly into the flow conductor portion 44a below he valve. At the upper position illustrated by the broken line representation of the ball valve in FIG. 5, flow may not occur through the valve in the central bore 64 to the side port 71 in the valve.

The well system 40 allows well production upwardly through the flow conductor 44 and valve 50 from the well bore portion 55 below the packer 53. Also, the system permits closing the flow conductor at the valve so there is no fluid communication to the lower producing portion of the well bore while a closed circuit fluid flow pattern is established in the well including the flow conductor 44 above the valve 50 and the line 51. When the pressure in the producing portion 55 of the well bore below the packer, as communicated in the open lower end 44a of the flow conductor below the valve 50, is greater than the pressure in the line 51 and the flow conductor 44 above the valve 50, the ball valve 80 is forced to an upper end position against the seat [75] *74*, closing off the bore 64 through the valve 50 so that well fluids being produced flow upwardly into the lower end 44a of the flow conductor into the valve 50 and radially outwardly through the ports 73 below the ball valve. The fluids then flow upwardly in the annulus 65 into the flow conductor 44 above the valve to the surface. When it is desired to shut off production flow through the valve 50, the valve 45 may be closed, and with the valve 52 open, the pressure may be increased through the control line 51 until the ball valve 80 is forced downwardly from the upper end position to a lower end position on the seat [74] *75*, thereby shutting off communication through the valve 50 into the flow conductor portion 44a below the packer 53. With the valve 80 at the lower end position, communication is established through the valve 50 between the control line 51 and the flow conductor 44 above the valve 50. Fluid pressure is transmitted and flow may occur from the annulus 65 in the valve 50 through the ports 73 above the valve 80 into the bore 64 and laterally through the side port 71 into the control line 51. So long as the pressure in the control line and upper portion of the flow conductor 44 exceeds the pressure in the production portion 55 of the well bore below the packer, the ball valve 80 will remain at the lower seated position, and fluids may be pumped back and forth as desired through the well system along a flow path defined by the control line 51, the valve 50, and the flow conductor 44 above the valve 50. When well production is again desired through the flow conductor to the surface, the pressure applied to the control line is decreased until the formation pressure below the packer exceeds the pressure above the ball valve 80 so that the ball valve is moved to the upper end position shutting off communication into the control line 51 and permitting upward production flow to again occur to the surface through the valve 50 and the conductor 44.

During production and treating procedures in the well the pressure in the annulus 54 may be controlled through the line 60 and valve 61. The annulus 54 above the packer 53 may be maintained liquid filled if desired. In the particular arrangement illustrated in FIG. 1, no communication is provided from the annulus 54 into either the control line 51 or the conductor 44. Thus, in the system of FIG. 1, utilizing the valve of FIG. 5, the annulus is isolated from the production conductor and control line, production may be had through the main flow conductor 44, and the producing zone below the packer 53 in the well bore may be shut off by pressure in the flow conductor and control line above the valve 50, while circulation as desired is accomplished between the control line and flow conductor above the valve.

Figure 2:
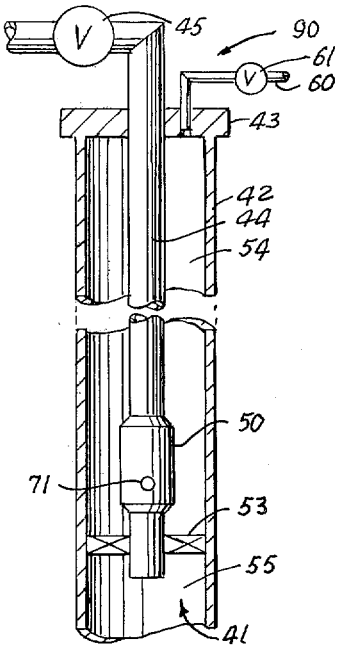
FIG. 2 is a view similar to FIG. 1 of another form of well flow system embodying the invention.

FIG. 2 illustrates a well system 90 embodying the invention which includes the casing 42, the well head 43, and the flow conductor 44. The flow conductor has the surface valve 45 for control of flow into and out of the flow conductor. The packer 53 seals within the casing around the flow conductor below the valve 50. The side port 71 in the valve 50 communicates directly with the annulus 54 of the well bore above the packer 53, while communication at the well head into the annulus is provided through the line 60 and valve 61. The well in the system of FIG. 2 is produced through the flow conductor and the valve 50 in the same manner as the system 40 with well fluids flowing from below the packer 53 upwardly through the flow conductor 44 so long as the fluids are at a pressure in excess of both the pressure in the flow conductor 44 above the valve 50 and the pressure in the annulus 54. The ball valve 80 may be forced downwardly to shut off production into the flow conductor by raising the annulus pressure through the line 60 to a value sufficient to force the ball valve 80 to the lower seated position. So long as the valve 80 is held on the seat 74, the well system may be circulated through the flow conductor 44 above the valve 50, through the valve 50, and through the annulus 54. Fluids may flow in either direction through the annulus and flow conductor 44 above the valve 50 so long as the pressure is maintained above the formation fluids pressure to keep the valve 80 seated at the lower end position.

Another form of well system 100 embodying the invention is shown in FIG. [4] *3*. Functionally the system 100 is essentially the same as the system 40 in FIG. 1 with the exception of the packer 53 which is not included in the system 100. Like components have been given the same reference numerals in the system 100 as used in the system 40 in FIG. 1. A flow conductor 101 having a valve 102 is connected through the well head into the side port 71 of the valve 50. The conductor 100 performs the same function as the control line 51 but is, however, capable of more flow and thus it would be more adaptable to pumping well tools to and from the valve 50. In the well system 100, so long as the pressure in the well bore exceeds the pressure in the conductor 101, the ball valve 80 is held at the upper end position allowing well fluids to flow to the surface through the valve 50 and the conductor 44. Since no packer is present in the well, the pressure in the well bore within the casing may result from well formation pressure or could be supplied in the line 60 connected into the well head. In this system, maintenance of a pressure in the well bore either from formation fluids or as applied externally through the line 60, permits circulation between the well bore and the flow conductor 44 to the surface irrespective of the source of the well bore pressure. When the pressure in the conductor 101 is raised to a level exceeding the well bore pressure, the valve 80 is forced downwardly on the seal 74 permitting circulation through the well between the flow conductors 44 and 101.

Figure 3:
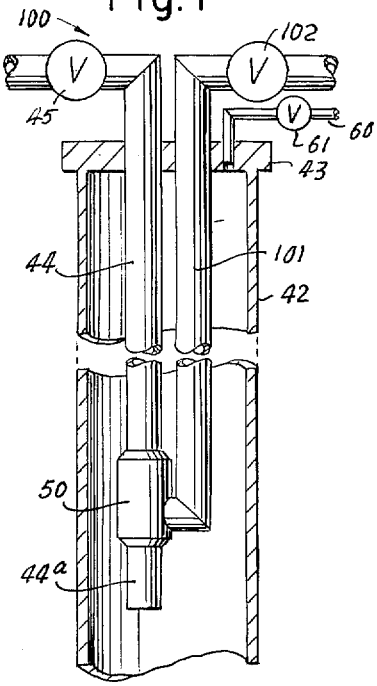
FIG. 3 is a view similar to FIG. 1 of a still further form of well flow system embodying the invention.
Figure 4:
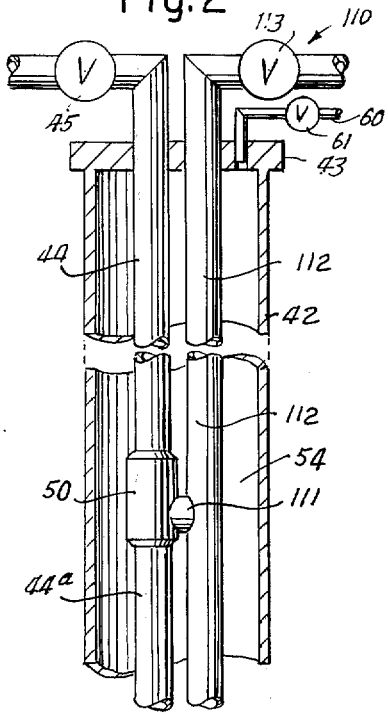
FIG. 4 is a view similar to FIG. 1 of another form of well flow system embodying the invention.

Another form of well system 110 embodying the invention, is shown in FIG. 4 wherein like components are referred to by the reference numerals used with respect to FIGS. 1, 2, and 3. The flow conductor 44 is connected through a cross-over connection 111 at the valve 50 to a parallel flow conductor 112 which includes a surface valve 113 above the well head. As in the other well systems shown, the annulus 54 in the well casing around the flow conductors communicates at the well head with a line 60 having a valve 61 to permit the control of pressure conditions in the annulus. The flow conductors 44 and 112 may extend to suitably packed-off producing zones of the well bore, not shown, which may be defined above an upper dual packer of conventional design sealing within the well casing around both of the flow conductors, with one of the flow conductors being perforated below the dual well packer for production of the well zone immediately below the packer. The other of the two flow conductors may extend through a lower single well packer to a second lower production zone so that the two flow conductors are utilized for the production of separate zones in the well bore, while the mechanism of the cross-over connection and the valve 50 will permit establishment of a circulation pattern between the flow conductors while shutting off the lower portion 44a of the flow conductor 44 below the valve 50. Depending upon well conditions, a suitable standing valve, not shown, may be included in the flow conductor 112 so that when the pressures are adjusted to circulate through the well in the flow conductors through the valve 50, the standing valve will prevent application of the circulation pressure to the well formation communicating with the conductor 112. In operating the well system 110 for dual production from separate producing zones, the higher pressure of the two producing zones is communicated with the flow conductor 44 to achieve simultaneous dual production. The ball valve 80 in the valve 50 must be at its upper position as shown in FIG. 5 for isolating the two flow conductors through the cross-over connection 111 while permitting flow from below the valve 50 through the flow conductor 44 at the same time flow is occurring from the other lower pressure producing zone in the conductor 112. It will be evident that if the higher pressure were in the flow conductor 112, the communication of this pressure through the cross-over flow passage 71 in the valve 50 would force the ball valve 80 to a lower seated position thereby shutting off the flow conductor portion 44a below the valve 50 to preclude production from the zone communicating with the conductor portion 44a. For circulation between the flow conductors through the valve 50, the pressure may be raised above the ball valve 80 by pumping into the flow conductor 112 until the pressure applied through the passage 71 exceeds the pressure in the flow conductor 44 to force the ball valve downwardly to the lower end position so that pumping circulation may occur between the portion of the flow conductor 44 above the valve 50 and the flow conductor 112. The increase in pressure in the flow conductor 112 closes the standing valve, [now] *not* shown, in the flow conductor 112 below the cross-over connection so that the producing formation communicating with the conductor 112 is not subjected to the circulation pressure. Once the ball valve 80 is forced to the lower end position, pumping in either direction through the U-shaped flow path defined by the conductors 44 and 112 through the valve 50 may be achieved so long as the pressure is kept to a value sufficient to hold the ball valve 80 on the seat 74. Obviously, the portion 44a of the flow conductor 44 below the valve 50 is not subjected to the circulation pressure.

It will be evident from the description of the well systems of FIGS. 1 and 4, including the valve of FIG. 5, that in each instance, the well valve of the system is located in the first of a plurality of flow passages in the well bore, is operable responsive to a pressure increase in one of the flow passages exterior of such first flow passage, and when so operated, functions to isolate the portion of the first flow passage in the well bore below the valve. The first flow passage above the valve and such other flow passage communicate through the valve. It will additionally be recognized that in the instance of each of the well systems the well valve is in the flow passage which under normal well operating conditions, is subjected to the higher of the pressures to which the valve 50 is exposed. Thus, with respect to the systems of FIGS. 1 and 2, when producing the well, the valve 50 is functioning to shut off the control line 51 in the system 40 and to isolate the well annulus 54 in the system 90. Similarly, in the systems 100 and 110 of FIGS. 3 and 4, the position of the valve in the higher pressure conductor serves to isolate the pair of parallel conductors of each system from each other during production of the well.

Figure 6:
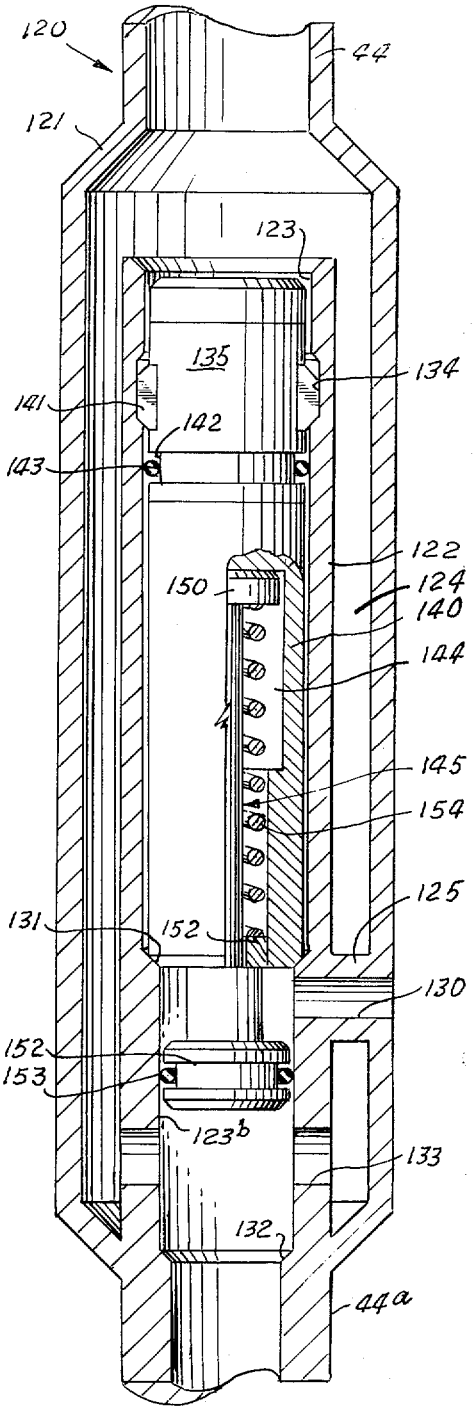
FIG. 6 is a schematic view in longitudinal section of another well valve which may be employed in the well systems of FIGS. 1–4 showing the valve at an upper end position.
Figure 7:
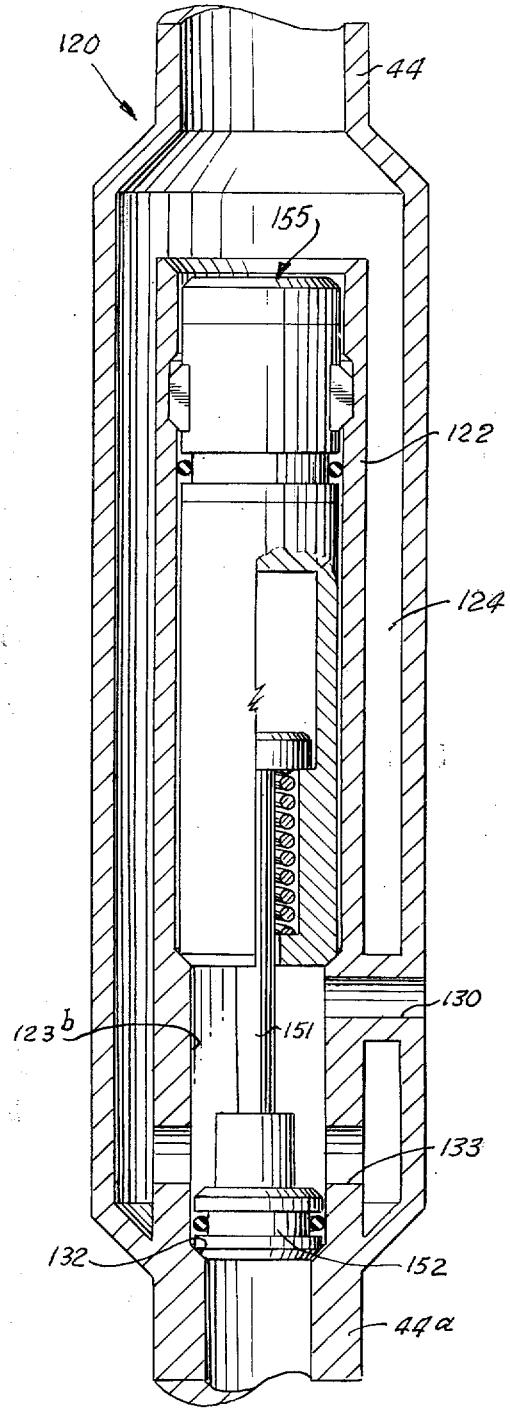
FIG. 7 is a view similar to FIG. 6 showing the well valve at a lower end position.

FIGS. 6 and 7 illustrate a valve and cross-over assembly 120 which is particularly useful in the well systems of FIGS. 1–4. The assembly 120 includes a housing 121 connectible by any suitable means into the flow conductor 44. An internal tubular body portion 122 is provided within the housing 121 concentrically spaced therein defining a central flow passage 123 through the body and an outer annular flow passage 124 around the body in the housing. The body 122 is connected by short conduit section 125 providing a side port 130 communicating the exterior of the valve housing with the central flow passage 123. The central flow passage 123 has an upper principal portion 123a above an internal annular supporting shoulder 131 and a lower reduced portion 123b extending downwardly from the shoulder 131 to an internal annular valve seat 132. The lower portion 123b of the central flow passage communicates through ports of 133 in the internal housing portion 122 with the annular flow passage 124. The internal housing 122 has an internal annular locking recess 134 around and near the upper end of the upper central flow passage portion 123a. A removable valve 135 is releasably locked in the central flow passage 123 of the valve assembly 120 for controlling flow to the side port 130. The valve 135 has a cylindrical body 140 provided along its upper end portion with expandable and contractible locking dogs 141 adapted to engage the locking recess 134 for locking the valve in the internal body portion 122. The locking dog arrangement including the locking dogs 141 may comprise any suitable conventional locking mandrel such as those manipulated by wireline techniques as illustrated on page 3,832 of the Composite Catalog of Oilfield Equipment and Services, 1970–71 Edition, published by World Oil, Houston, Tex. The valve body 140 has an external annular recess 142 in which ring seal 143 is disposed for sealing around the valve body within the central flow passage 123. The valve body has a valve member and spring chamber 144 for a vertically movable valve 145 which includes an upper spring retainer flange 150, a valve rod 151, and a valve member 152 provided with an external ring seal 153 for sealing around the valve member within the lower flow passage portion 123b. The valve 145 is biased upwardly by a spring 154 confined between the upper spring flange 150 and an internal stop flange 152 formed in the valve body 140 at the lower end of the chamber 144. The valve member is movable between an upper end position as in FIG. 6 and a lower end position as in FIG. 7. At the position of the valve in FIG. 6, the valve member 152 is disposed between the side port 130 and the ports 133 communicating with the central passage portion 123b so that the port 130 and the ports 133 are isolated from each other. Thus, at this valve position in the well system flow may occur from the lower flow conductor portion 44a upwardly and outwardly through the ports 133 into the annular space 124 from which the fluids flow upwardly into the conductor 44. The flow through the well conductor 44 is isolated from the flow passage connected with the side port 130, which may be the well annulus or another flow conductor. The upward force on the valve member 145 is the combination of the force of the spring 154 biasing the valve upwardly and the pressure in the well fluids in the flow passage portion 123b below the valve member 152. An increase in the pressure applied through the side port 130 to the valve member 152 above the ring seal 153 to a level at which the force of the pressure exceeds the upward force on the valve member moves the valve to a lower end position against the seat 132. At this lower end position, the lower conductor portion 44a is isolated from the well conductor above the seat 132, while the ports 133 and the side port 130 communicate through the central flow passage portion 123b so that the well may be circulated between the upper portion of the flow conductor 44 above the valve and the side port 130. So long as the pressure above the valve member is sufficient to hold it at the lower end position of FIG. 7, the well may be circulated with the flow conductor portion 44a below the valve isolated. When the pressure above the valve member is reduced to a level at which the force of the spring and the pressure below the valve member may lift the valve member, the valve member is returned to the upper end position to again effectively close the side port 130 and permit well flow through the flow conductor 44a from below the valve. Thus, well systems including the valve 120 are responsive to casing, control line, or parallel tubing, depending upon the particular well system, for shutting off the lower portion of the flow conductor containing the valve and establishing well circulation through the valve. The valve cannot be opened or moved to a circulating position by increasing the pressure in the flow conductor containing the valve.

Figure 8:
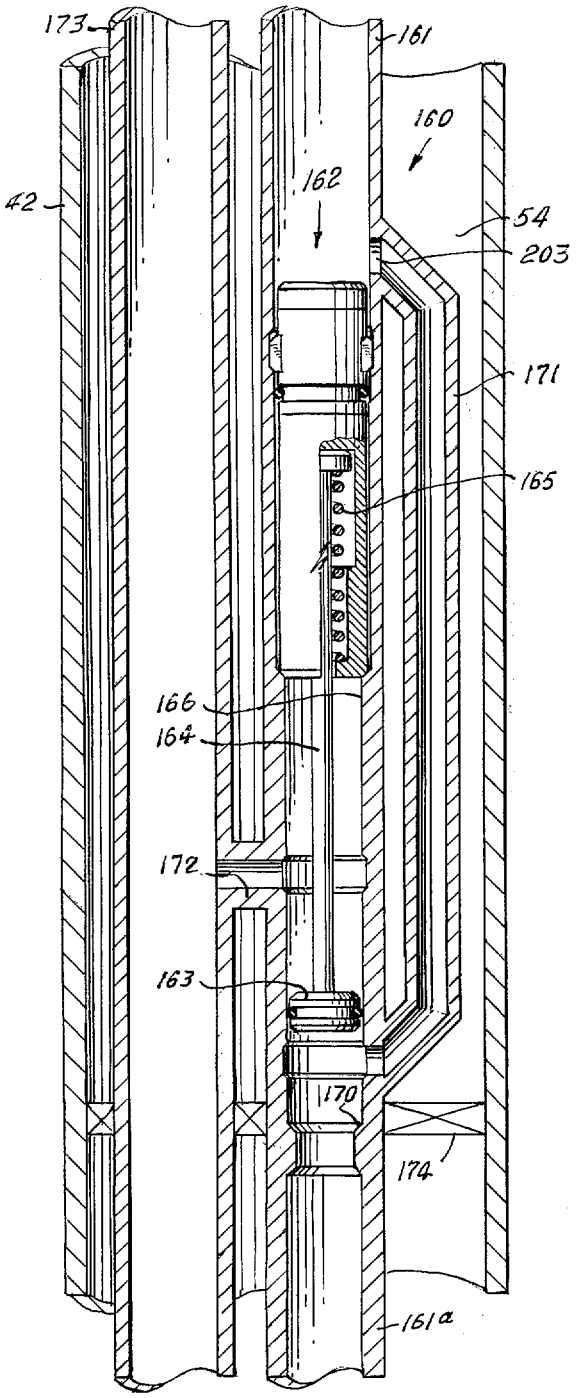
FIG. 8 is a longitudinal fragmentary view in section of flow conductors and a well valve in a system similar to that shown in FIG. 4 with the valve at an upper end position.
Figure 9:
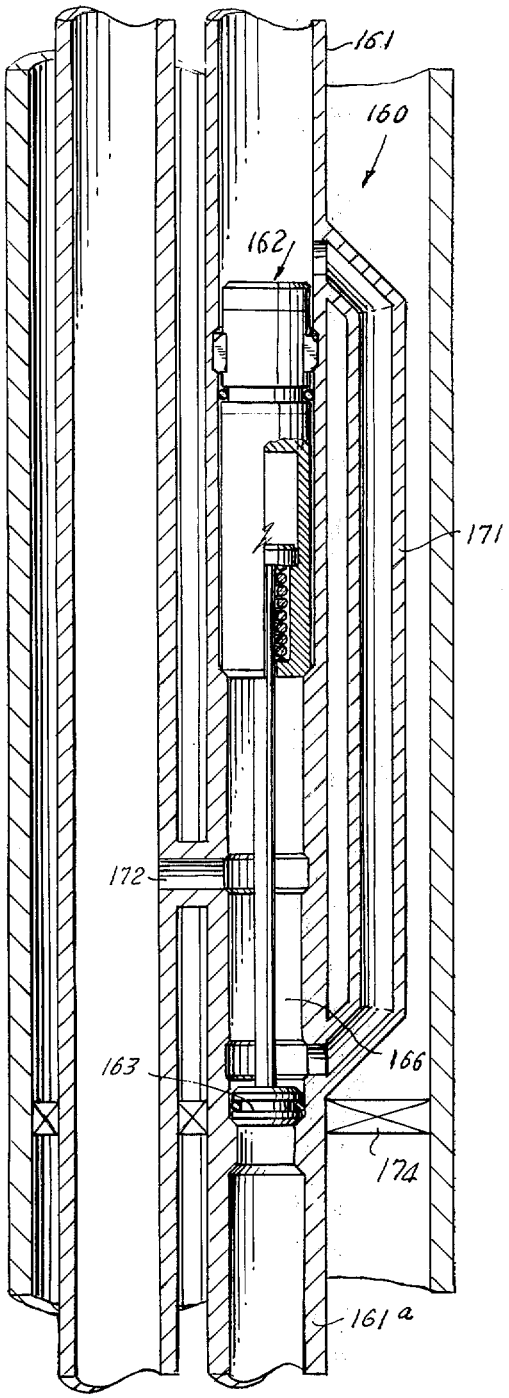
FIG. 9 is a view similar to FIG. 8 with the valve moved to a lower end position.

FIGS. 8 and 9 show another valve and cross-over assembly 160 which may be used in well systems similar to those of FIGS. 3 and 4. The system includes a flow conductor 161 having a lower portion 161a which may extend to a producing formation along the well bore. The valve assembly includes a removable spring-biased valve 162 which has a valve member 163 supported on a valve rod 164 biased in an upward direction by a spring 165. The lower flow conductor portion has an annular valve seat 170 engageable by the valve member 163 at a lower end position for isolating the conductor portion 161a below the valve assembly. A by-pass flow line 171 is connected at opposite ends into the flow conductor 160 around the valve 162. The lower end of the by-pass line connects into the flow conductor 160 above the valve member 163 when the valve member is at a lower end seated position as illustrated in FIG. 9. The conductor 161 communicates through a cross-over connection 172 into another flow conductor 173 which extends upwardly to the well head and downwardly to a producing formation, not shown, communicating with the well bore. The flow conductors 161 and 173 extend through a suitable, conventional dual packer 174 which seals within the well casing 42 around both of the flow conductors. The flow conductor 173 and the lower portion 161a of the conductor 161 may extend to separate producing zones in the well bore to permit dual production in the well system. The flow conductor 173 is preferably provided with a standing valve, not shown, at a depth below that portion of the conductor shown in FIG. 8 to permit production upwardly through the flow conductor while precluding downward flow through the conductor when the well is being circulated through the valve assembly 160.

In the operation of the valve system 160, with the valve position as illustrated in FIG. 8 the well may be produced through both of the flow conductors simultaneously. Well fluids entering the flow conductor 173 flow through the conductor directly to the surface. Well fluids entering the lower conductor portion 161a flow upwardly in the conductor to the junction of the conductor with the by-pass line 171. The valve member 163 diverts the well fluids into the by-pass line through which they flow around the valve 162 and back into the flow conductor 161 above the valve and to the surface. The valve member 163 at the position of FIG. 8 prevents communication between the flow conductors 161 and 173. The normal production pressure in the conductor 161 exceeds the pressure in the conductor 173. The force of the pressure in the flow conductor 161 below the valve member 163 and the spring 165 hold the valve at the upper end position at which it remains to isolate the two flow conductors so long as the combined force from the spring and pressure in the conductor 161 exceeds the downward force on the valve member 163 from the pressure in the flow conductor 173.

When well circulation from the surface through the flow conductors 161 and 173 and the valve assembly 160 is desired, the relative pressures in the flow conductors are adjusted as by increasing the pressure in the conductor 173 to a value at which the downward force on the valve member 163 exceeds the upward force on the spring 165 and the pressure in the conductor portion 161a below the valve member. The valve member 163 is forced downwardly to the lower end position of FIG. 9 at which the valve member seats on the valve seat 170.

At the lower end position of the valve member the lower conductor portion 161 is isolated, and the flow conductors 161 and 173 communicate through the valve bore 166 above the valve member 163 and the cross-over connection 172. Downward flow in the conductor 173 is prevented by virtue of the standing valve in the conductor, not shown. So long as sufficient pressure is maintained above the valve member 163 to keep it at the lower end position, flow may occur from the well head in either direction through the flow passage system including the flow conductors 161 and 173. For example, if fluids are pumped into the well through the conductor 161, they pass downwardly in the conductor, through the bypass line 171, into the valve bore 166 above the valve member 163, and across through the cross-over connection 172 into the flow conductor 173 through which the fluids return to the surface. The reverse of this flow pattern is followed by fluids pumped into the flow conductor 173 at the surface with returns moving upwardly in the flow conductor 161. There is no communication with the annulus 54 during such well circulation. After the well has been serviced as desired, reduction in the pressure in the flow conductor 173 permits the valve member 163 to return upwardly to the upper end position at which the flow conductors are again isolated from each other, and simultaneous well production may occur in the conductors. The annulus 54 may be maintained liquid full in view of the fact that there is no communication between the annulus and either of the flow conductors.

Figure 10:
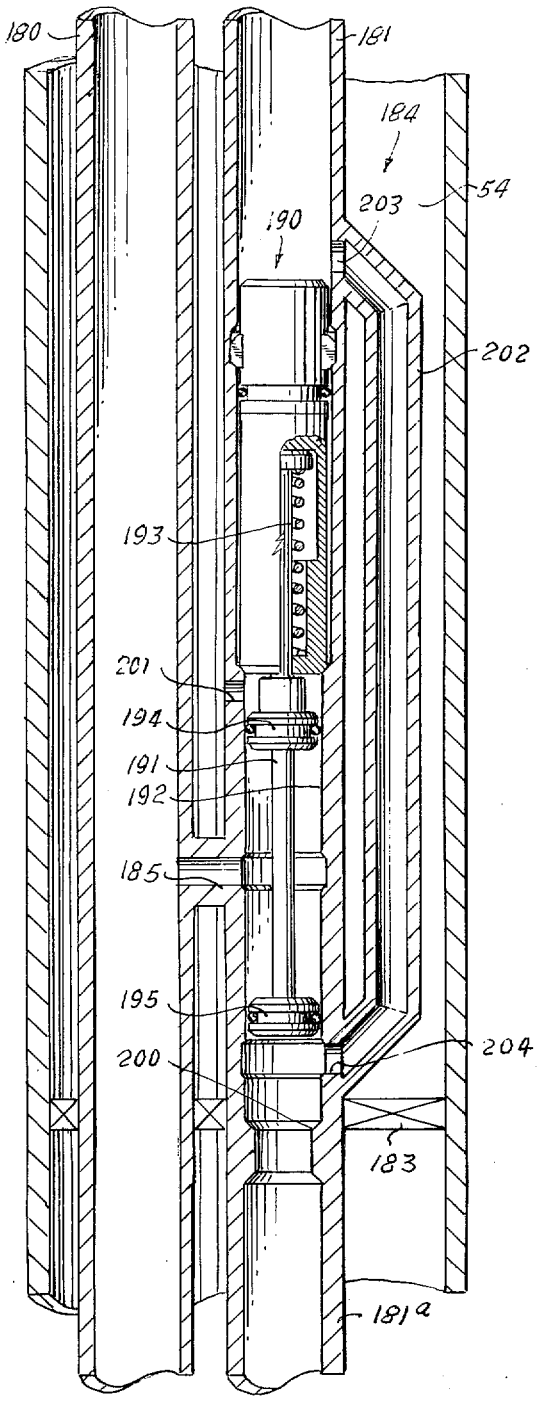
FIG. 10 is a fragmentary longitudinal sectional view of flow conductors and a well valve for a system similar to that of FIG. 4 showing the well valve at an upper end position.
Figure 11:
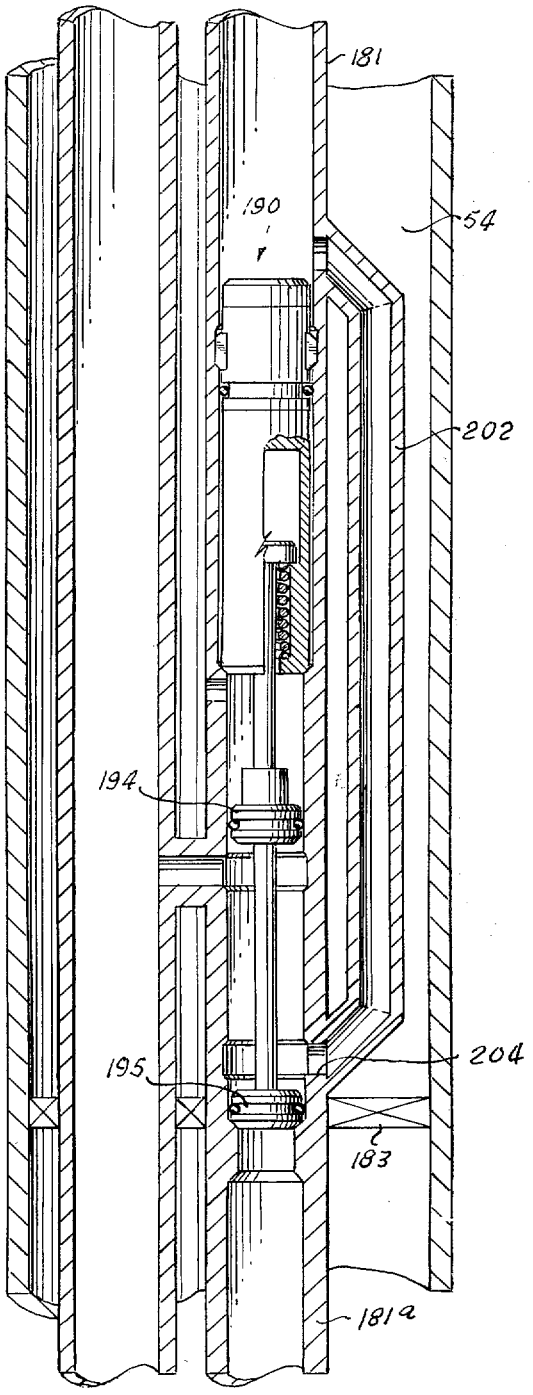
FIG. 11 is a view similar to FIG. 10 with the valve moved to a lower end position.

Another form of well system embodying the invention is illustrated in FIGS. 10 and 11. A pair of flow conductors 180 and 181 are disposed in the casing 42 through a dual packer 183 extending to producing formations, not shown. The flow conductor 180 may include a standing valve, not shown, to prevent back flow during well circulation between the flow conductors. The flow conductors are interconnected through a valve assembly 184 by a cross-over connection 185. The valve assembly includes a removable valve 190. The valve has a valve stem 191 which is longitudinally movable in a valve bore 192 which communicates at the upper end thereof with the flow conductor 181 and at the lower end with a lower portion 181a of the flow conductor 181. The valve stem is biased upwardly by a spring 193. A pair of spaced upper and lower valve members 194 and 195 are supported on the valve stem above and below the cross-over connection 185 between the flow conductors. The lower flow conductor portion 181a has an annular valve seat 200 engageable by the lower valve member 195 when the valve stem and members are at a lower end position. A side port 201 in the conductor 181 communicates the well annulus 54 around the flow conductors with the valve bore 192 above the upper valve member 194 whereby the valve functions responsive to the annulus pressure. A by-pass line 202 connects the flow conductor 181 above the valve 190 with the lower flow conductor portion 181a below the valve member 195. The by-pass line communicates through a port 203 at its upper end with the flow conductor above the valve and through a port 204 at its lower end with the lower portion of the valve bore 192. The port 204 is spaced above the valve seat 200 so that the valve member 195 when on the seat 200 is below the port 204. Well fluids from a formation communicating with the flow conductor 180 flow directly to the well head. When the valve is at the position of FIG. 10, the well fluids from a formation communicating with the lower flow conductor portion 181a flow through the side port 204, the by-pass line 202 and into the upper flow conductor portion 181 through the side port 203, thereby passing the valve 190. The port 201 communicates the casing annulus 54 around the flow conductors with the valve bore 192 above the upper valve member 194. So long as the force of the pressure within the flow conductor 181 below the valve member 195, combined with the force of the spring 193, exceeds the force of the pressure applied from the casing annulus through the port 201 to the upper valve member 194, the valve remains at the upper end position of FIG. 10, isolating the two flow conductors for simultaneous production through both conductors. The pressure within the flow conductor 180 as applied to the valve members through the cross-over connection 185 does not affect the valve; thus, regardless of the pressure in such flow conductor, the valve position is not altered. The upper and lower valve members are of the same cross sectional area, and thus the upward force applied to member 194 is counterbalanced by the downward force applied to member 195. The upper valve member 194, irrespective of the valve position, always remains between the cross-over connection 185 and the port 201 to the casing annulus precluding communication at all times between the casing annulus and either of the flow conductors. When communication is desired for fluid flow between the flow conductors 180 and 181, the pressure relationship between the flow conductor 181 below the lower valve member 195 and the casing annulus pressure is changed, such as by increasing the casing annulus pressure until the force from such pressure as applied through the port 201 to the upper valve member 194 exceeds the force of the spring 193 and the force of the pressure in the flow conductor 181 applied to the lower valve member 195. The valve is moved downwardly to the lower end position shown in FIG. 11, at which position the lower flow conductor portion 181a is isolated by the seating of the lower valve member 195 on the valve seat 200 below the port 204 leading to the by-pass line 202. With the valve member 195 below the port 204 the conductors 180 and 181 communicating through the valve bore 192 which connects with the cross-over connection 185 and the port 204. Thus, fluid flow may occur between the flow conductor 180 and the upper portion of the flow conductor 181 through the port 203, the by-pass line 202, the port 204, the valve bore 192 between the lower valve member 195 and the upper valve member 194, and the cross-over connections 185 into the flow conductor 180. The casing annulus remains isolated from the flow conductors. So long as the casing annulus pressure is maintained sufficiently above the pressure in the flow conductor portion 181a below the lower valve member 195, fluid may flow in either direction between the flow conductors 180 and 181. When return of the valve to the upper end position of FIG. 10 is desired, the casing pressure is reduced to permit the spring 193 and the pressure below the lower valve member 195 in the lower conductor portion 181a to lift the valve back upwardly. Thus, the valve system shown in FIGS. 10 and 11 permits the isolation of parallel flow conductors from each other and the communication of such flow conductors with each other responsive to casing pressure while isolating the lower portion of the flow conductor containing the valve from the remainder of the well system, at all times isolating the casing annulus pressure from both of the flow conductors.

Figure 12:
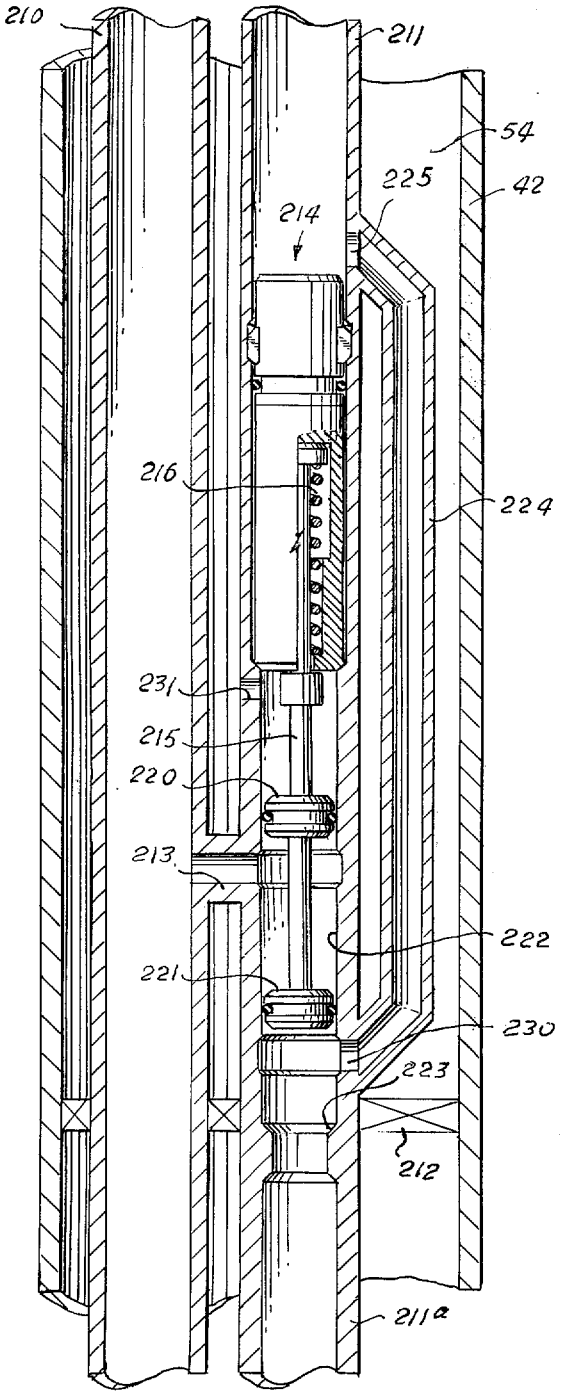
FIG. 12 is a longitudinal fragmentary sectional view of another flow conductor and well valve arrangement for a system similar to FIG. 3 showing the valve at an upper end position.
Figure 13:
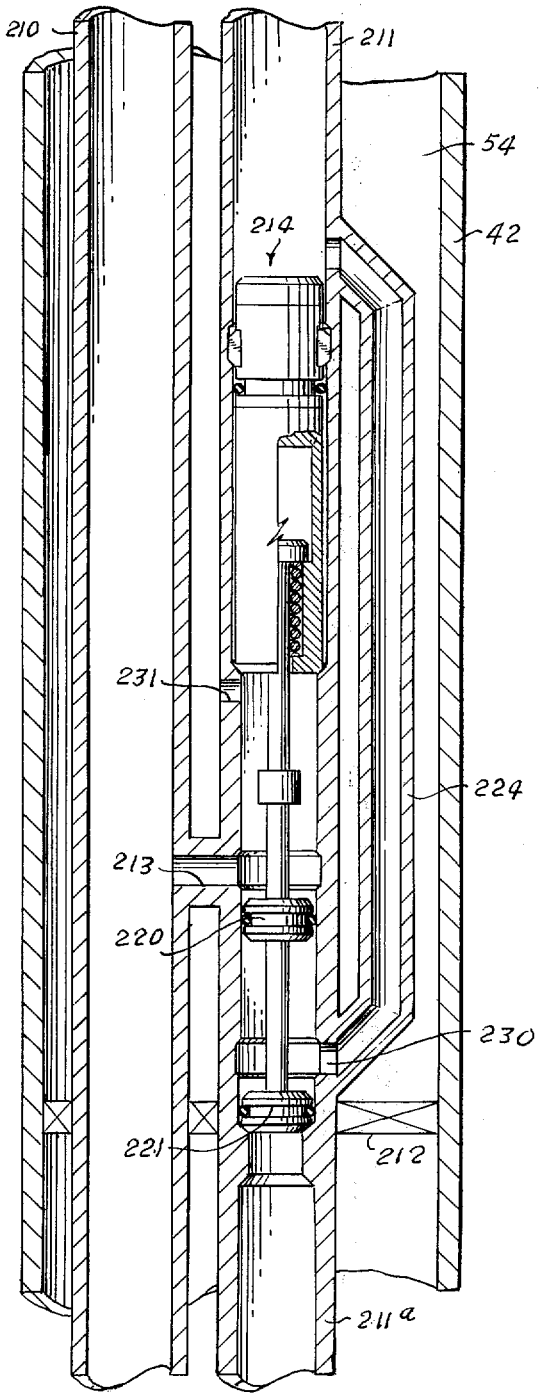
FIG. 13 is a view similar to FIG. 12 illustrating the valve at a lower end position.

FIGS. 12 and 13 illustrate a still further form of valve arrangement in a well system which permits dual production at one valve position and communicates the casing annulus and one flow conductor while isolating the other flow conductor at another valve position. Referring to FIGS. 12 and 13, a pair of flow conductors 210 and 211 are supported in the casing 42 through a dual well packer 212 extending in the well to dual production zones, not shown. The flow conductor 210 includes a standing valve, not shown, to prevent backflow during well servicing procedures into the producing formation communicating with the flow conductor. The flow conductors communicate through a cross-over connection 213. A valve 214 is removably supported in the flow conductor 211 for controlling communication with the cross-over connection. The valve includes a stem 215 supporting a pair of spaced upper and lower valve members 220 and 221, respectively, movable along a bore portion 222. An annular valve seat 223 is disposed at the lower end of the bore 222 to cooperate with the lower valve member 221 for shutting off communication to the lower flow conductor portion 211a. A by-pass line 224 is connected into the flow conductor 211 around the valve 214. The by-pass line communicates with the flow conductor 211 through an upper port 225 above the valve 214 and through a lower port 230 with the valve bore 222 above the valve seat 223 below the upper end position of the lower valve member 221. The valve stem 215 is biased upwardly by a spring 216. A port 231 in the flow conductor 211 communicates with the valve bore 222 above the upper valve member 220. At the upper position of the valve 214 shown in FIG. 12, the flow conductors 210 and 211 are open to the surface and are isolated from each other and from the casing annulus 54. The upper valve member 220 is disposed in the bore 222 between the port 231 and the cross-over connection 213, precluding casing annulus communication with the conductor 210. The lower valve member 221 is disposed in the bore 222 between the port 230 and the cross-over connection, preventing communication between the flow conductors 210 and 211. Any pressure changes in the flow conductor 210 communicated through the cross-over connection are applied equally to the upper valve member 220 and the lower valve member 221 so that pressure variations in the flow conductor 210 do not affect the position of the valve when the valve is at the upper end position. Fluids may flow from the lower flow conductor portion 211a upwardly through the lower port 230, the by-pass line 224, and the upper port 225 into the upper flow conductor portion 211 through which the fluids flow to the well head. A sufficient increase in the casing annulus pressure applied through the port 231 to the upper valve member 220 forces the valve downwardly against the combined force of the spring 216 and the pressure in the flow conductor 211 as applied upwardly to the lower valve member 221. The valve stem 215 along with the upper and lower valve members 220 and 221 moves downwardly until the lower valve member seats on the annular surface 223 below the port 230. At such lower valve position the upper valve member is disposed below the cross-over connection 213 so that the well annulus 54 communicates with the flow conductor 210 through the port 231, the bore 222 above the upper valve member and the cross-over connection. The movement of the upper valve member below the cross-over connection prevents communication between the flow conductors 210 and 211 while the movement of the lower valve member against the seat 223 isolates the lower flow conductor portion 211a. At this lower valve position the upward forces on the valve are the force of the spring 216 and the force of the pressure in the lower conductor portion 211a below the lower valve member 221. The downward force on the valve is provided by the annulus pressure in the bore 222 above the upper valve member 220. So long as this downward force exceeds the upward force on the valve, the well may be circulated in either direction between the flow conductor 210 and the casing annulus 54. During such circulation the upper and lower sections of the flow conductor 211 are isolated from each other and from the conductor 210 and the annulus 54. When return of the valve upwardly is desired, the pressure is lowered in the casing annulus and the flow conductor 210 to a level sufficient to permit the spring 216 and the pressure in the lower flow conductor portion 211a to return the valve upwardly so that the well may again be produced through both of the flow conductors 210 and 211.

Figure 14:
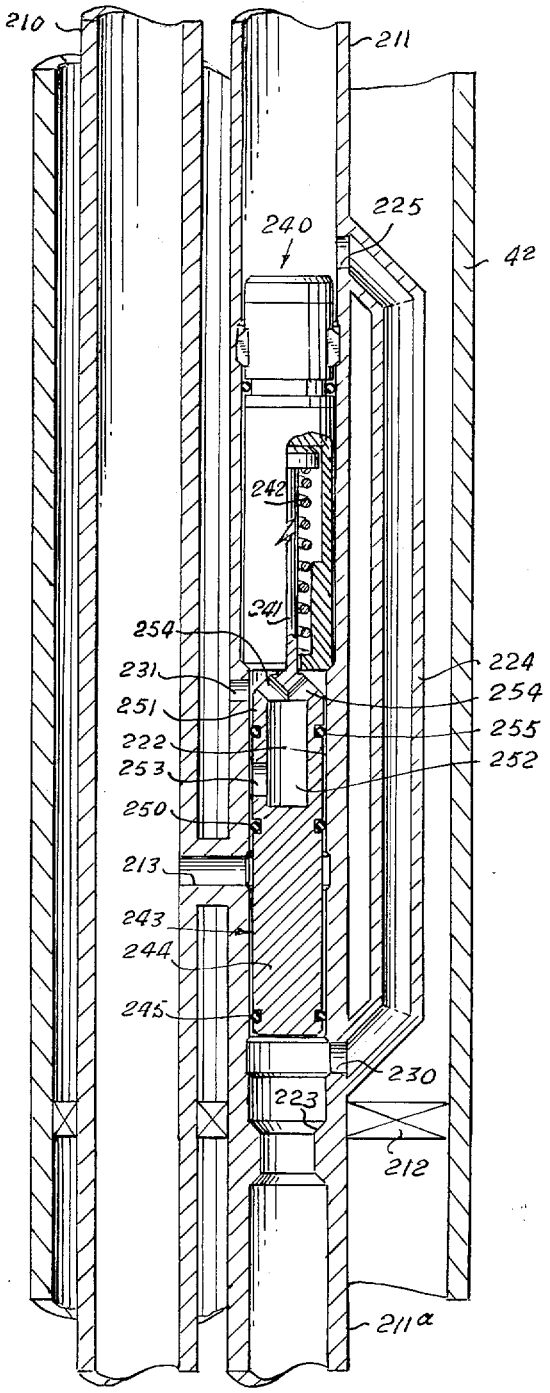
FIG. 14 is a fragmentary longitudinal sectional view of another flow conductor and well valve arrangement for a system similar to FIG. 3 with the valve at an upper end position.
Figure 15:
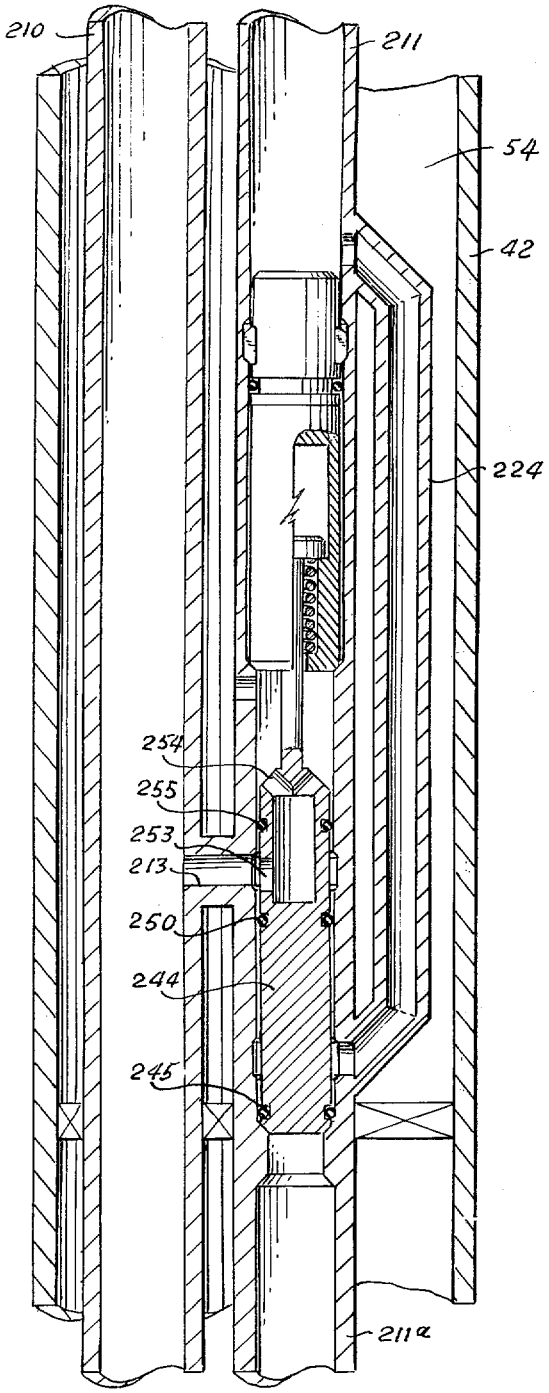
FIG. 15 is a view similar to FIG. 14 with the valve moved to a lower end position.

FIGS. 14 and 15 show a valve arrangement which functions in the same way as the valve system of FIGS. 12 and 13, utilizing, however, a different valve design. The well flow conductor system, including the by-pass line 224, shown in FIGS. 14 and 15, is identical to that shown and described with reference to FIGS. 12 and 13 and, thus, identical reference numerals to those in FIGS. 12 and 13 are used in FIGS. 14 and 15 for identical components of the well system. A removable valve 240 is supported in the flow conductor 211 for controlling the flow functions of the flow conductor 211 and the communication between the casing annulus and the flow conductor 210. The valve includes a stem 241 biased upwardly by a spring 242. A valve member 243 is supported on the stem for movement between the upper end position shown in FIG. 14 and the lower end position of FIG. 15. The valve member has a solid lower portion 244 supporting a pair of longitudinally spaced external annular ring seals 245 and 250 which seal around the lower valve member portion with the surface of the bore 222. The valve member has an upper portion 251 provided with a chamber 252 and a lower port 253 and upper ports 254 opening into the chamber. A ring seal 255 is disposed around the upper valve member portion between the port 253 and the ports 254. At the upper position of the valve member shown in FIG. 14, one zone of the well is produced through the flow conductor 210 while another zone is produced through the lower flow conductor portion 211a, the by-pass line 224 around the valve 240, and the upper portion of the flow conductor 211. The ring seals 245 and 250 on the valve member 243 are above Best Available Copy and below the cross-over connection 213 so that the flow conductor 210 is isolated from [either] *both* the well annulus and the flow conductor 211. While the casing annulus pressure communicates with the bore 222 through the port 231, into the valve member 252 through the ports 254, and further into the valve bore 222 through the port 253 below the ring seal 255, the middle ring seal 250 prevents such casing annulus pressure from being applied to the cross-over connection 213 at the upper end position of the valve. The upward forces on the valve are provided by the spring 242 and the pressure in the flow conductor 211 on the valve member over the area defined by the lower ring seal 245. The pressure from the flow conductor 210 through the cross-over connection 213 is applied equally to the upper ring seal 250 and the lower ring seal 245 providing counter-balancing upward and downward forces on the valve member. The net downward force is provided by the pressure in the casing annulus on the valve member as applied through the port 231 over the area defined by the ring seal 255 or 250. The ring seals 250 and 255 seal the same area; the pressures applied to the ring seals from within the valve chamber 252 through the port 253 are equal both upwardly and downwardly so that the net downward force is applied over the area of the ring seal 255 resulting from the annulus pressure. An increase in the annulus pressure sufficient to overcome the spring 242 and the upward force on the valve member from the pressure in the flow conductor 211 forces the valve member downwardly to the lower end position of FIG. 15. At the lower end position of the valve member, the casing annulus 54 communicates with the flow conductor 210 through the valve member ports 254, the valve chamber 252, and the valve member port 253 into the cross-over connection 213. The lower end of the valve member engages the valve seat 223, shutting off communication to the lower conductor portion 211a so that the upper and lower portions of the flow conductor 211 are isolated while the casing annulus 54 communicates with the flow conductor 211. Reduction in the pressure in the casing annulus and flow conductor 210 permits the valve to move back upwardly to the upper end position of FIG. 14. Thus, this form of valve arrangement is casing pressure responsive to communicate the casing annulus with one of the flow conductors while isolating the upper and lower portions of the other of the flow conductors at one position of the valve, and permitting simultaneous production through both of the flow conductors which are isolated from each other and from the casing at the other position of the valve.

Figure 16:
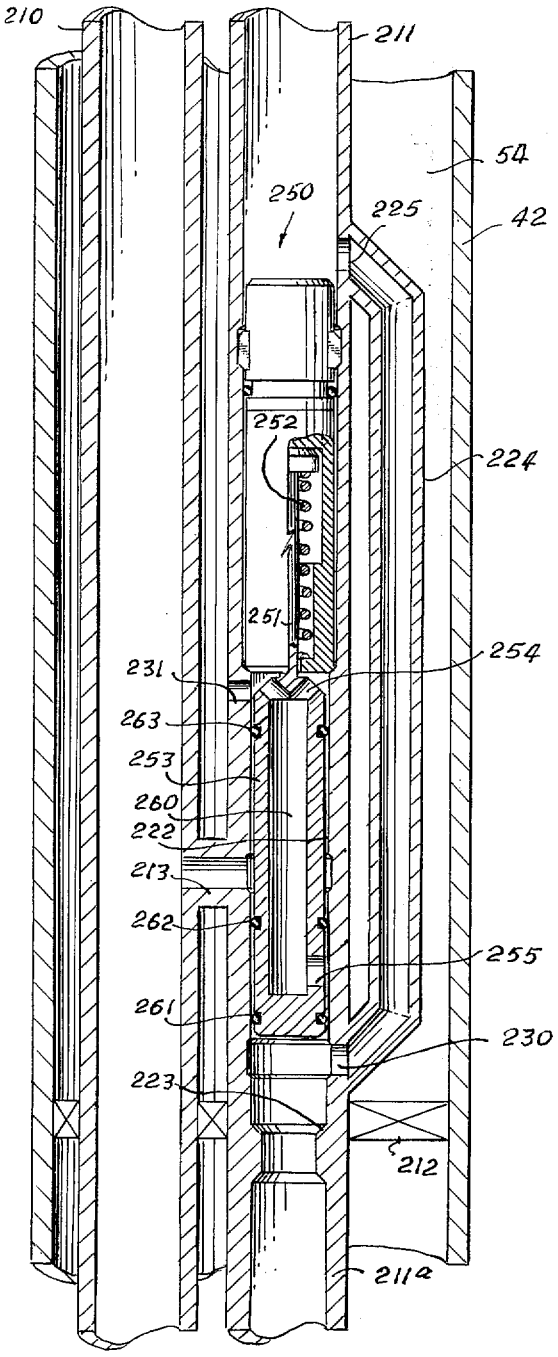
FIG. 16 is a longitudinal sectional view of another flow conductor and well valve arrangement for a well system similar to FIG. 3 with the valve at an upper end position.
Figure 17:
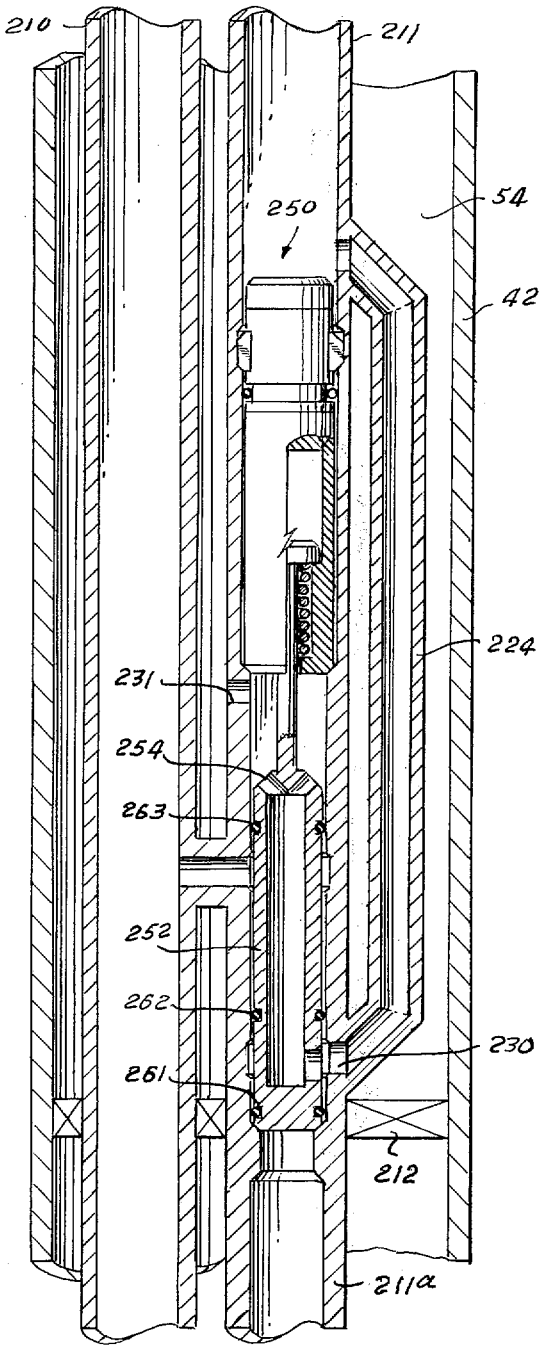
FIG. 17 is a view similar to FIG. 16 with the valve moved to a lower end position.

The well valve arrangement shown in FIGS. 16 and 17 utilizes the same well flow conductor system described and illustrated in FIGS. 12–14 and, thus, like components of such system are identified by like reference numerals as used in FIGS. 12–14. A valve 250 is removably supported in the flow conductor 211 for isolating the casing annulus and the flow conductors in the position shown in FIG. 16 and for communicating the casing annulus with the flow conductor 211 in the valve position of FIG. 17. The valve 250 has a valve stem 251 biased in an upward direction by spring 252 and supporting a hollow valve member 253. The valve member has upper ports 254 and a lower port 255 which communicate with an inner chamber 260 of the valve member. The valve member supports lower, intermediate, and upper external ring seals 261, 262, and 263 which seal around the valve member and the surface defining the bore 222. The ring seals 261 and 262 are disposed on opposite sides of the cross-over connection 213 at both the upper and lower positions of the valve member, thereby isolating the flow conductor 210 through the cross-over connection from both the casing annulus and the flow conductor 211 at all times. At the upper position of the valve member shown in FIG. 16 fluids may flow to the surface in both of the flow conductors 210 and 211, with the fluids in 211 by-passing the valve 250 in the by-pass line 224. While fluids from the annulus 54 communicate with the valve member through the port 231, the several ring seals around the valve member prevent annulus pressure from being exposed to either of the flow conductors. For example, annulus pressure exists within the valve chamber 260 in the valve member, and thus exists around the valve member because of the port 255 between the ring seals 261 and 262, with the ring seal 261 preventing communication into the flow conductor 211. A sufficient increase in the casing annulus pressure through the port 231 to the valve member forces the valve member downwardly to the lower end position seated against the valve seat 223. At this valve position the conductor 210 remains isolated from the other portions of the well system, the lower conductor portion 211a is shut off by the seating of the lower end of the valve member against the surface 223, while the casing annulus is communicated with the flow conductor 211 above the seat 223. The well may be circulated between the well conductor 211 and the casing annulus along a path defined by the by-pass line 224, the port 230, and the valve member port 255, and the valve chamber 260, the ports 254 in the valve member, and the flow conductor 231 to the casing annulus 54. So long as the pressure in the intercommunicating casing annulus and flow conductor 211 provides a force on the valve member exceeding the upward force of the spring 252 and the pressure below the valve member in the lower flow conductor portion 211a, the valve remains at the lower end position. A change in the pressure relationships sufficient to permit the pressure below the valve member with the force of the spring to lift the valve upwardly returns the valve to the position of FIG. 16 isolating the casing annulus and the two flow conductors to again permit dual production from the well through the flow conductors.

Figure 18:
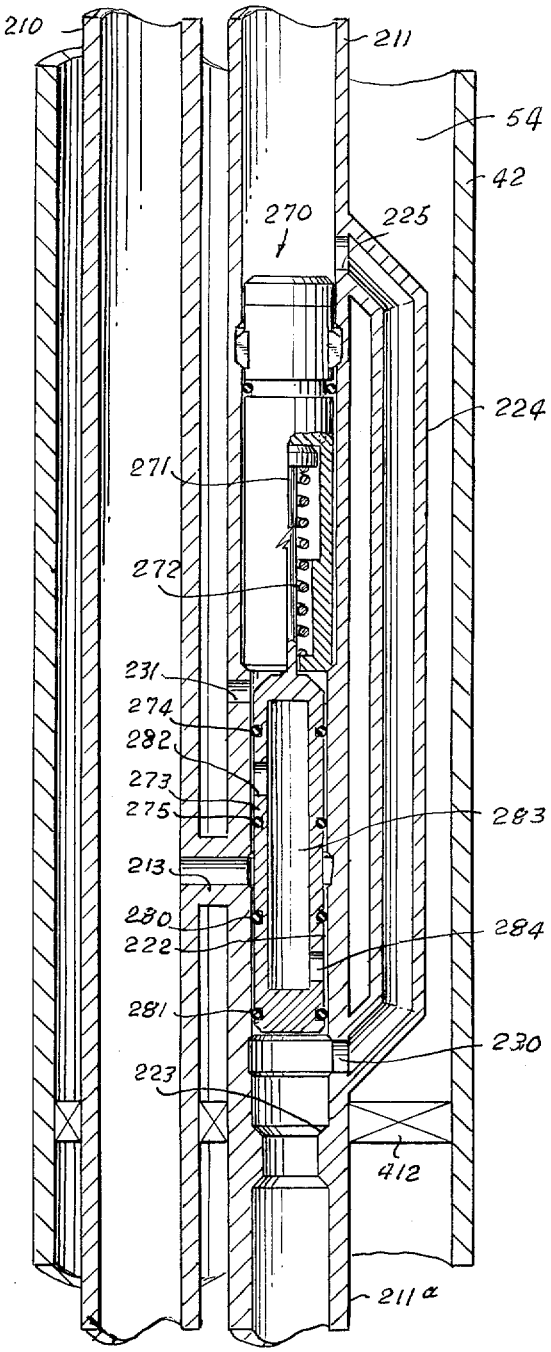
FIG. 18 is a longitudinal fragmentary sectional of another arrangement of flow conductors and well valve for a well system similar to FIG. 3 showing the valve at an upper end position.
Figure 19:
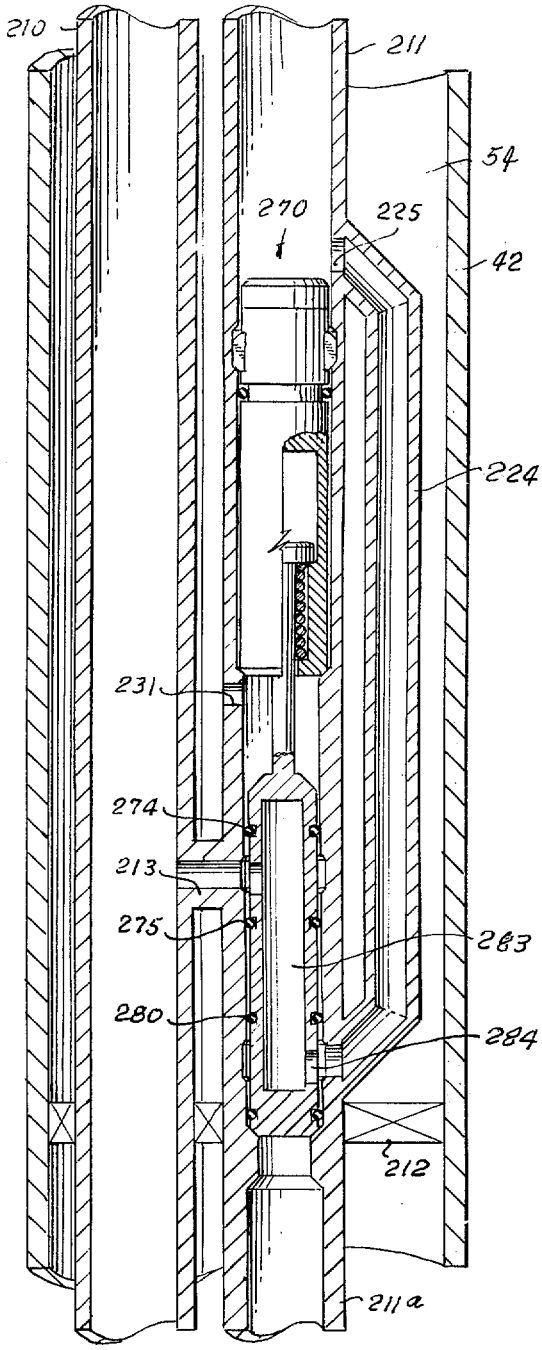
FIG. 19 is a view similar to FIG. 18 with the valve moved to a lower end position.

The well valve arrangement shown in FIG. 18 uses the same flow conductor system shown in the arrangement of FIGS. 12–17 and, thus, like reference numerals are used in FIGS. 18 and 19 to denote like flow conductor components. A valve 270 is releasably supported in the flow conductor 211 for isolating the two flow conductors 210 and 211 from each other during dual production of the well and for communicating the conductors with each other during well servicing procedures. The valve 270 has a stem 271 biased upwardly by a spring 272 and provided with a hollow valve member 273 movable in the bore 222. The valve member has four longitudinally spaced external ring seals 274, 275, 280, and 281 for sealing around the member with the wall of the bore 222. An upper port 282 in the valve member communicates with a chamber 283 provided in the member while a lower port 284 in the member communicates with the valve chamber. The upper port is disposed between the ring seals 274 and 275; the lower port is disposed between the lower pair of ring seals 280 and 281. At the upper position of the valve shown in FIG. 18 the casing annulus 54 and the flow conductors 210 and 211 are all isolated from each other. The ring seals 275 and 280 prevent communication along the valve member within the bore 222 from the cross-over connection 213; the upper ring seal 274 prevents fluid communication along the valve member from the port 231; and the lower end ring seal 281 prevents fluid communication upwardly along the valve member from the flow conductor 211. Since the pressure from the flow conductor 210 as transmitted through the cross-over connection 213 applies equal upward and downward forces on the valve member by virtue of the identical sealed areas defined by the ring seals 275 and 280, pressure variations in the flow conductor 210 at the upper position of the valve in FIG. 18 do not affect the valve position. Upward forces on the valve are provided by the spring 272 and the pressure in the flow conductor 211 acting over the area sealed by the ring seal 281, and a downward force is applied by the pressure in the annulus 54 through the port 231 to the area sealed by the ring seal 274. An increase in the casing annulus pressure to a sufficient value forces the valve member downwardly to the position of FIG. 19 against the force of the spring and the upward force of the pressure in the flow conductor 211. The valve member is forced against the valve seat 223 sealing off the lower flow conductor portion 211a. The upper valve member port 282 is aligned with the cross-over connection 213, and the lower valve member port is aligned with the flow conductor port 230 leading to the by-pass line 224 so that the flow conductors 210 and 211 communicate through the chamber 283 of the valve member. The casing annulus remains isolated from both of the flow conductors. So long as the downward force of the casing pressure through the port 231 on the valve member exceeds the upward force of the pressure in the lower flow conductor portion 211a and the spring 272, the valve member stays at a lower end position to permit fluid flow between the flow conductors in either direction through the valve member and the cross-over connection for well servicing purposes. A reduction in the casing pressure applied to the valve member permits the spring and the pressure in the lower flow conductor portion 211a to lift the valve back to an upper end position to again isolate the flow conductors from each other. Thus, the valve member effectively communicates and isolates the flow conductors while maintaining the casing annulus isolated and is operable responsive to variations in the casing annulus pressure relative to the pressure in the flow conductor 211.

Figure 20:
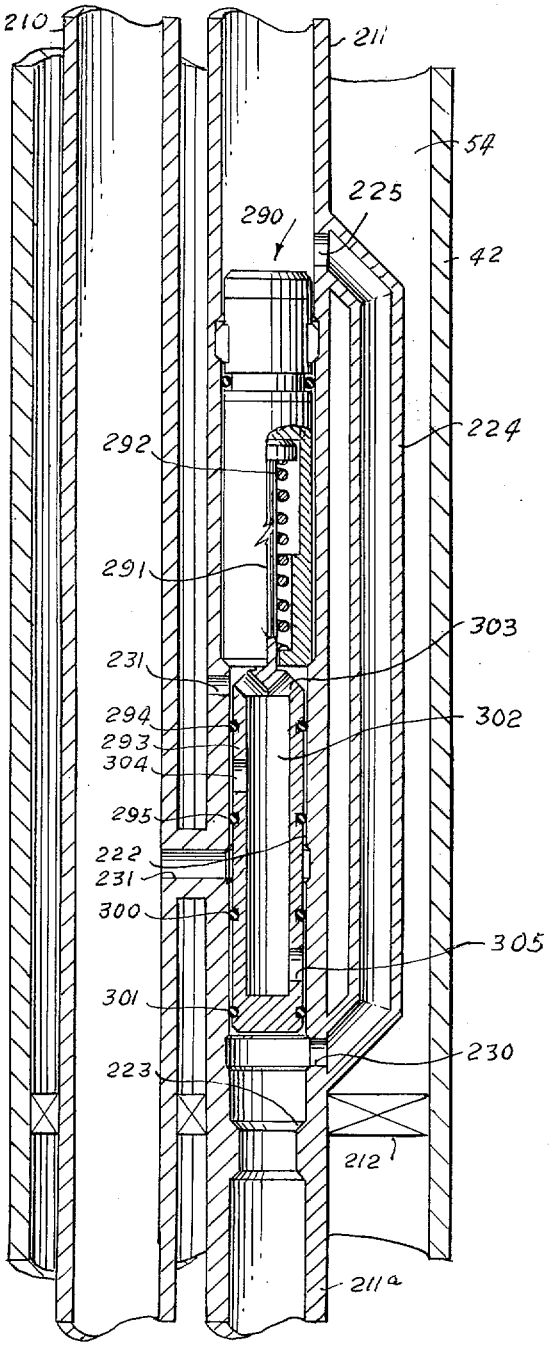
FIG. 20 is a longitudinal fragmentary sectional view of another arrangement of flow conductors and a well valve for a well flow system similar to FIG. 3 showing the valve at an upper end position.
Figure 21:
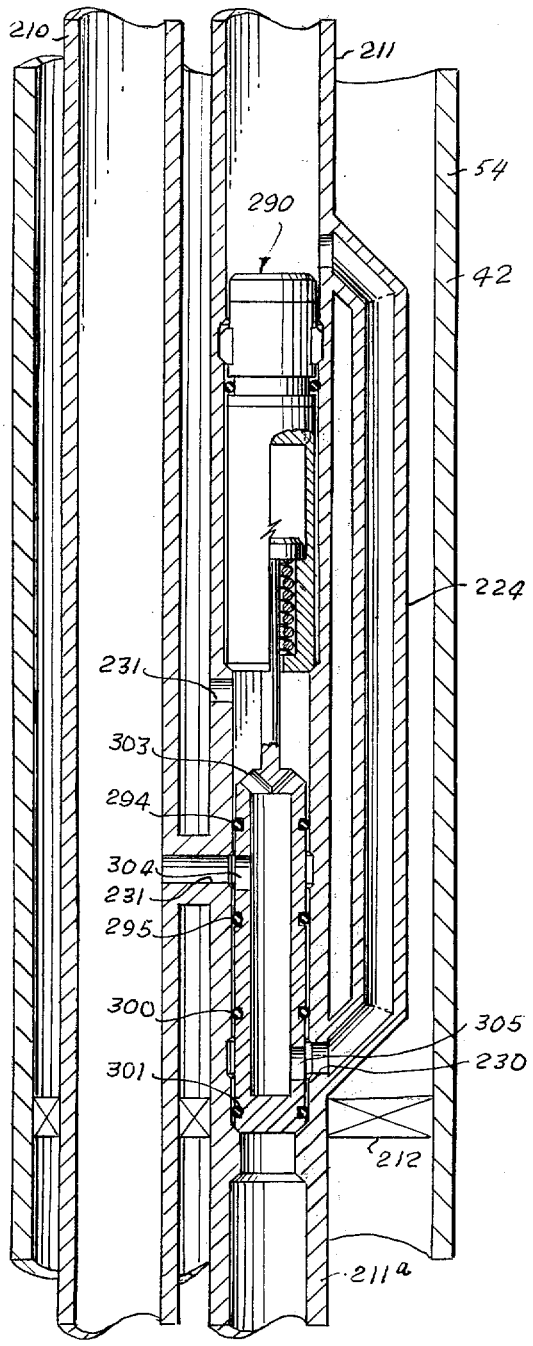
FIG. 21 is a view similar to FIG. 20 showing the valve moved to a lower end position.

FIGS. 20 and 21 show a still further form of valve system using the conduit arrangement shown in FIGS. 12–17, the components of which are referred to by the same reference numerals used in such figures. A removable valve 290 is supported in the flow conductor 211 for controlling the flow relationship between the casing annulus 54 and the flow conductors 210 and 211. The valve has a valve stem 291 biased in an upward direction by a spring 292 and supporting a hollow valve member 293 which is movable between an upper end position as shown in FIG. 20 and a lower end position illustrated in FIG. 21. At the upper end position of FIG. 20, the flow conductors 210 and 211 are isolated from each other and from the casing annulus 54 so that the well may be simultaneously produced through both flow conductors. At the lower end position of FIG. 21 the well annulus and both of the flow conductors are all in communication with each other while the lower portion 211a of the flow conductor 231 is isolated from the remainder of the system. The valve member 293 has an upper pair of spaced external ring seals 294 and 295 and a lower pair of spaced external ring seals 300 and 301. The valve member has a central valve chamber 302 which defines a passage through the member for flow between the flow conductors and the casing annulus. The valve member has upper end ports 303, an upper side port 304, and a lower side port 305, all of which communicate with the chamber 302 in the valve member. The upper side port 304 is located between the ring seals 294 and 295 and is alignable with the cross-over connection 231 when the valve member is at the lower end position of FIG. 21. Similarly, the lower side port 305 is located between the ring seals 300 and 301 and is alignable with the flow conductor 230 leading to the by-pass line 224 when the valve is at the lower end position. With the valve at the upper end position of FIG. 20, the upward forces on the valve member are provided by the spring 292 and the pressure in the flow conductor 211 below the valve member applied over the area defined by the ring seal 301. A downward force on the valve member is provided by the casing annulus pressure applied into the bore 222 to the valve member over an area defined by the ring seal 294. It will be recognized that the pressure in the casing annulus is communicated through the ports 303 into the chamber 302 of the valve member and outwardly through the ports 304 and 305 into the bore 222. This pressure, however, does not affect the valve member due to the presence of the ring seals 294 and 295 spanning the port 304 and the ring seals 300 and 301 spanning the port 305 so that the casing annulus pressure as communicated through the valve member at the upper end position of the valve member cannot be communicated along the bore 222 to either of the flow conductors 210 and 211. Variations in the pressure in the flow conductor 210 as communicated to the valve member through the cross-over connection 231 do not affect the valve member because of the ring seals 295 and 300 sealing around the valve member in the bore 222 above and below the cross-over connection, such sealed areas being equal and thus not tending to force the valve member in either direction. When the casing annulus pressure is increased sufficiently to overcome the force of the spring 272 and the conductor 211 pressure urging the valve member upwardly, the valve member moves downwardly to the lower end position of FIG. 21. The valve member seats against the annular surface 223 isolating the lower flow conductor portion 211a and aligning the lower valve member port 305 with the conductor port 230 and the upper valve member side port 304 with the cross-over connection 231. At this position of the valve member, the casing annulus 54 communicates through the port 231 and the upper end valve member ports 303 into the valve member chamber 302; the flow conductor 210 communicates through the cross-over connection 231 and the valve member side port 304 into the valve member chamber; and the flow conductor 211 communicates through the by-pass line 224 and the port 230 into the side port 305 to the valve chamber member 302. Thus, the two flow conductors and the casing annulus are all simultaneously in communication with each other for well servicing procedures involving fluid flow between the flow conductors and casing annulus as may be desired. A standing valve, not shown, in the flow conductor 210 and the shutting off of the lower flow conductor portion 211a by the valve member isolates the lower portions of the well from the pressure of any fluid flow which may be carried out between the casing annulus and the flow conductors, thereby protecting the formations from higher pressures and possible formation-damaging fluids and debris. When the pressure applied downwardly to the valve member from the circulation in the casing annulus and flow conductors is reduced to a sufficient value, the pressure in the lower flow conductor portion 211a lifts the valve member back to the upper end position of FIG. 20, again isolating the casing annulus and the flow conductors 210 and 211 from each other and recommunicating the flow conductor portion 211a with the by-pass line 224 so that dual production may again be effected in the well.

Figure 22:
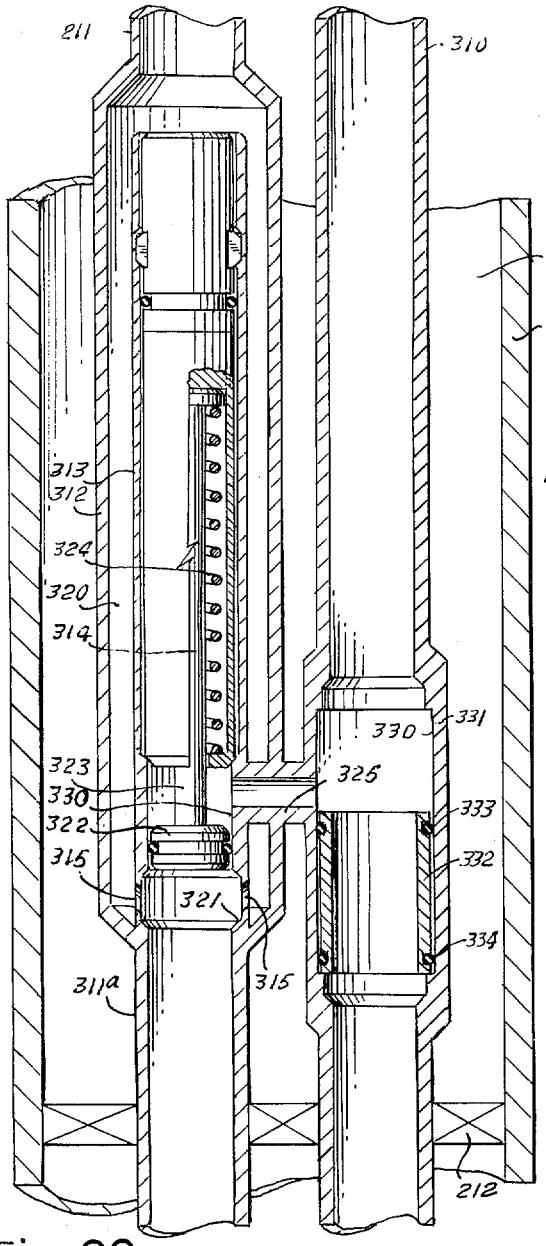
FIG. 22 is a longitudinal fragmentary sectional view of a still further form of flow conductor and well valve arrangement for a system similar to that of FIG. 3 utilizing a sliding sleeve valve in one flow conductor and a fluid responsive control valve in the other flow conductor, showing the valve at an upper end position.
Figure 23:
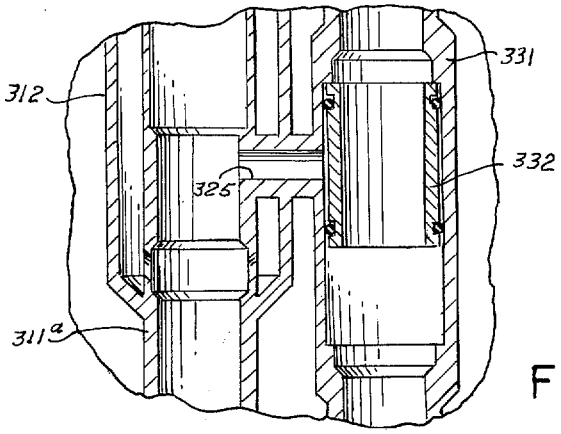
FIG. 23 is a fragmentary longitudinal view in section of a portion of the wall system of FIG. 22 with the well valve removed and the sliding sleeve valve moved upwardly to a closed position.

FIGS. 22 and 23 illustrate a form of well flow conductor system embodying the invention in which the flow conductors may be isolated from each other by a sliding sleeve valve if operation is desired without a well valve in place. Referring to FIG. 22 a pair of well flow conductors 310 and 311 are disposed in the casing 42 through a dual well packer 212 for producing two zones of a well. The flow conductor 311 includes an enlarged valve section having a housing portion 312 in which an upstanding tubular landing nipple 313 is disposed in concentric inwardly spaced relationship for supporting a removable valve 314. The landing nipple has lower ports 315 which communicate immediately above the upper end of the lower conductor portion 311a with an annular space 320 defined between the valve housing 312 and the valve landing nipple 313 whereby fluid flowing upwardly in the lower conductor section flows outwardly and upwardly around the valve when it is at the upper end position of FIG. 22. An annular valve seat 321 is provided at the juncture of the landing nipple with the lower flow conductor section below the port 315 to receive a valve member 322 on a valve stem 323 of the valve 314. The valve stem is biased upwardly by a spring 324. The flow conductor 311 is secured by a cross-over connection 325 to the flow conductor 310. The cross-over connection opens into the bore 330 of the landing nipple above the valve member 322 at its upper position. The flow conductor 310 has an enlarged valve section 331 to which the cross-over connection 325 is secured. A sliding sleeve valve 332 is movably disposed in the valve section 331 and provided with a pair of spaced external annular ring seals 333 and 334. At the lower end position of the sleeve valve 332 shown in FIG. 22 the cross-over connection 325 communicates with the flow conductor 310. At the upper end position of the sleeve valve in FIG. 23 the flow conductors 310 and 311 are isolated from each other by virtue of the presence of the seals 333 and 334 in the valve housing 331 above and below the cross-over connection 325. The sliding sleeve valve is particularly useful under conditions where the valve 314 is removed from the well system, and isolation of the two flow conductors is desired. At the upper end position of the valve member 322, as shown in FIG. 22, the flow conductors may simultaneously produce and are isolated from each other by the valve member 322. An increase in pressure in the flow conductor 310 applied through the cross-over connection 325 to the valve member 322 forces the valve member 322 downwardly against the seat 321 shutting off the lower conductor section 311a and communicating the flow conductors 310 and 311 through the cross-over connection and the valve bore 330 above the valve member 322. Fluids may be circulated between the flow conductors 310 and 311, and when return of the valve to the upper position of FIG. 22 is desired, the circulation pressure is reduced in the communicating flow conductors until the pressure under the valve member 322 applied through the lower conductor section 311a and the spring 324 forces the valve member back upwardly. FIG. 23 shows the valve 314 removed and the sliding sleeve valve 332 moved to the upper end position for isolating the flow conductors from each other. The sliding sleeve valve is moved by suitable wireline apparatus and methods.

Figure 24:
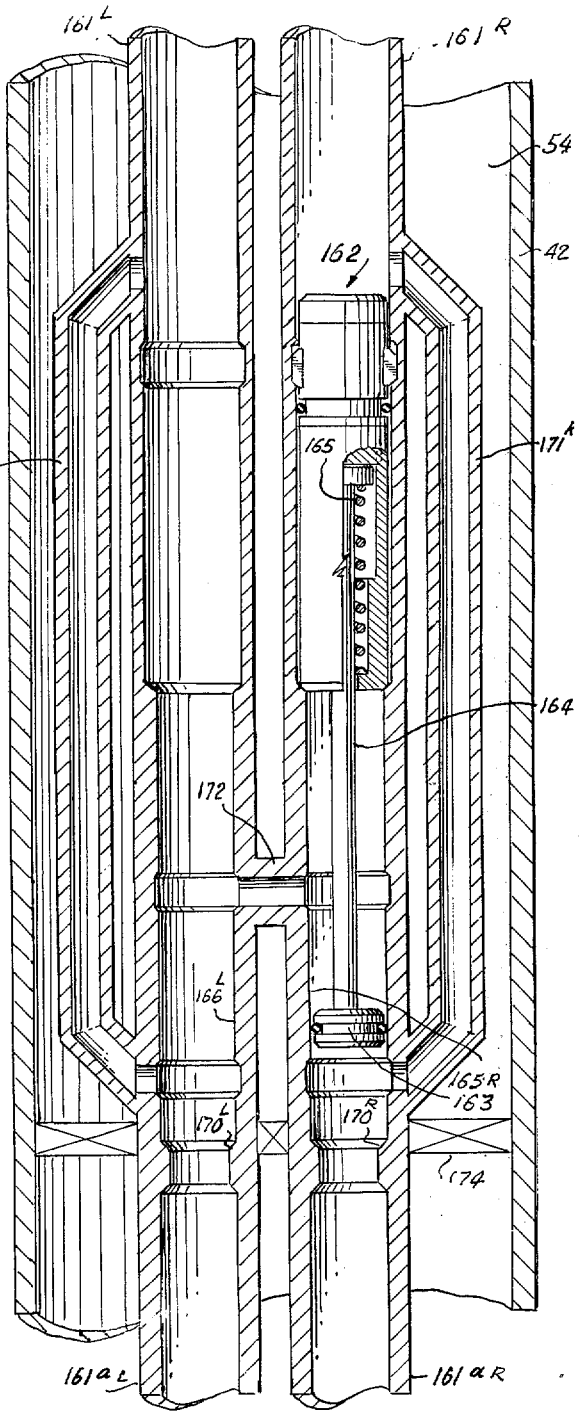
FIG. 24 is a fragmentary longitudinal view in section of another form of flow conductor and well valve arrangement including a bypass along each flow conductor and means for locking the well valve in either of the flow conductors.

FIG. 24 illustrates a well system in which each of the flow conductors employed has a landing nipple arrangement and a by-pass line so that the valve used may be positioned in either of the flow conductors whereby the well system may be arranged to provide for communicating the flow conductors with each other responsive to the pressure in either of the conductors, depending on the one in which the valve is disposed. The well system includes a pair of identical flow conductors 161L and 161R which communicate through a cross-over connection 172. Essentially, the system of FIG. 24 includes a pair of flow conductors which are fitted out as the right-hand flow conductor 161 in FIGS. 8 and 9. With the valve 162 removably locked in the right flow conductor 161R and the valve member 163 at the upper position shown in FIG. 24 between the cross-over connection 172 and the lower end of the by-pass line 171R, the flow conductors 161L and 161R are isolated from each other and both are open to the surface to permit simultaneous production through both flow conductors. In the well, the flow conductor 161R communicates with the higher pressure of the two formations to be produced through the well so that when both formations are producing, such higher pressure will maintain the valve in the position of FIG. 4 to permit simultaneous production through both flow conductors. An increase in the pressure in the left flow conductor 161L to a value sufficient to overcome the spring 165 and the upward force of the pressure in the flow conductor 161R on the valve member 163 will force the valve to the lower end position at which the valve member seats on the annular surface 170R. At this lower end position of the valve the lower right-hand flow conductor section 161aR is isolated while the two flow conductors 161L and 161R above the valve communicate with each other through the cross-over connection 172. Fluids flow between the flow conductors along a path from the lower end of the by-pass line 171R above the valve member 163, through the bore 166R along the valve stem 164 to the cross-over connection through which there is communication to the left flow conductor 161L. With the valve at the lower end position the well may be circulated between the two flow conductors through the cross-over connection so long as the force of the circulation pressure is maintained sufficiently above the forces of the pressure in the lower flow conductor section 161aR and the spring 165. When circulation has been completed, the circulation pressure is reduced and the valve returns upwardly to the position of FIG. 24 again isolating the two flow conductors and communicating the lower flow conductor portion 161aR through the bygpass line 171R to the upper portion of the conductor 161R. If well conditions require, the valve 162 may be operated in the identical position in the left flow conductor 161L. With the valve so positioned the flow conductors may be produced simultaneously and independently of each other with flow in the right flow conductor 161R flowing directly upwardly through the flow conductor while the flow in the left conductor passes around the valve through the by-pass line 171L. A sufficient increase in pressure in the right-hand flow conductor communicated through the cross-over connection 172 to the valve member 163 forces the valve member downwardly against the seat 170L to shut off communication with the lower flow conductor section 161aL while permitting communication between the flow conductors 161L and 161R through the cross-over connection, along the bore 166L into the by-pass line 171L above the valve member 163. So long as the circulation pressure through the flow conductors and cross-over passage is sufficient, the valve member will stay at its lower end position, and when such pressure decreases sufficiently, the valve returns upwardly to again isolate the two flow conductors from each other. Thus, the valve is positioned in the flow conductor leading to the higher pressure formation, and when well circulation between the flow conductors is desired, the pressure in the conductor leading to the lower pressure formation is raised to force the valve downwardly, isolating the higher pressure formation and communicating the two flow conductors. The casing annulus remains isolated from the flow conductors in the form of well system shown in FIG. 24.

Figure 25:
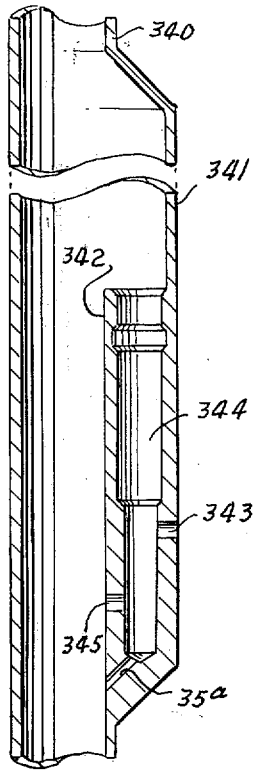
FIG. 25 is a broken, longitudinal, fragmentary view in section of a side pocket form of landing nipple for a well control valve.

FIG. 25 shows a section of a flow conductor 340 which may functionally serve the same purpose as the flow conductor arrangement shown in FIGS. 6 and 7. The conductor 340 has an enlarged housing portion 341 provided with a side-pocket form of landing nipple 342 in which a valve, such as the valve 135, may be landed and locked for controlling fluid flow from a casing annulus into the flow conductor. The section 341 has a port 343 connecting with the bore 344 of the landing nipple, while the landing nipple portion has port 345 spaced below the port 343 and communicating with the interior of the flow conductor. With the valve 135 in position in the side pocket and production fluids flowing upwardly in the conductor 340, the fluid pressure communicated through the port 345, together with the valve spring, maintains the valve at an upper position as shown in FIG. 6 so that the valve member 152 is disposed between the ports 343 and 345, thereby isolating the casing annulus from the flow conductor. An increase in casing annulus pressure to a sufficient value, as communicated through the side port 343 to the upper surfaces of the valve member 152, forces the valve member downwardly below the port 345, communicating the ports 343 and 345 through the bore of the landing nipple so that the casing annulus and the conductor 340 communicate with each other through the landing nipple bore. A small bleed line 350 is provided at the lower end of the landing nipple connecting into the flow conductor to relieve pressure condition below the valve member 152 which might hinder its movement to and from the lower end position.

Figure 26:
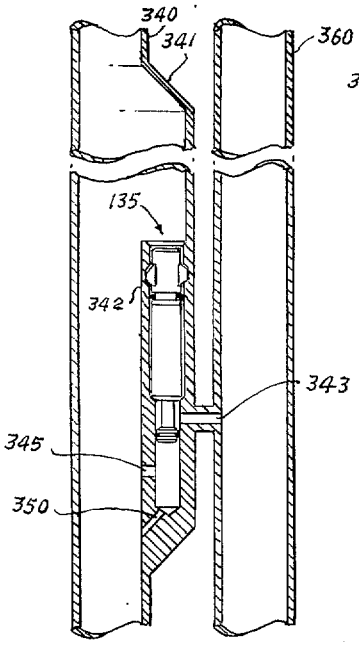
FIG. 26 is a broken longitudinal fragmentary view in section of a side-pocket landing nipple in one tubing string connected by a cross-over to another tubing string.

FIG. 26 shows a pair of tubing strings 340 and 360 interconnected through a side-pocket landing nipple of the type shown in FIG. 25 included in the tubing string 340. The tubing strings are communicated through the cross-over passage 343 which is selectively isolated from and connected with the tubing string 340 by the pressure responsive valve 135 which is releasably locked in the side pocket 342. The details of the valve 135 are described in connection with the form of the invention shown in FIGS. 6 and 7. The valve 135 is readily installed and removed in the side pocket 342 by use of suitable standard wireline tools. With the valve in place as shown in FIG. 26 and assuming that the tubing 340 contains the higher of the pressures in the two strings, the valve assumes the position illustrated in FIG. 26 isolating the two tubing strings and thereby permitting dual production through the strings. If communication of the two tubing strings is desired, the pressure relationship between the two strings is altered as by raising the pressure in the string 360 to a value sufficiently above that in the string 340 to move the valve downwardly to the position of FIG. 7 at which the two tubing strings communicate along the cross-over passage 343, the bore of the side pocket, and the side pocket port 345. Once the valve is opened and as long as the pressure circulating in the tubing strings is maintained at a sufficiently high level, the valve remains at the lower end position permitting communication between the tubing strings. Reduction in the circulating pressure to a sufficiently low level permits the valve to return upwardly to the position of FIG. 26 at which the tubing strings are again isolated from each other.

Figure 27:
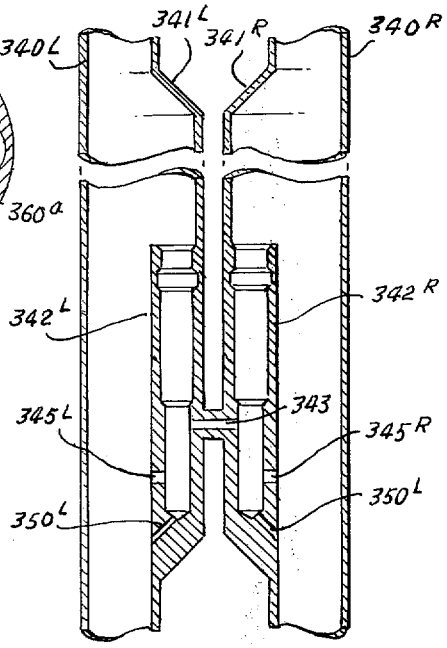
FIG. 27 is a broken longitudinal fragmentary view in section of interconnected side-pocket type landing nipples included in adjacent tubing strings of a well.

FIG. 27 shows a pair of interconnected tubing strings 340L and 340R each having identical side-pocket landing nipples which communicate through the cross-over passage 343. The valve 135 may be installed in either the side pocket 342L of the landing nipple 341L or the side pocket 342R of the landing nipple 341R. The valve is installed in the side pocket of the tubing string which normally operates at the higher of the pressures in the two tubing strings so that during normal well production through both of the tubing strings the valve 135 remains at the upper position illustrated in FIG. 26. Communication between the tubing strings through the passage 343 is established by changing the pressure relationship so that the pressure in the tubing string in which the valve is installed is lower than the pressure in the other tubing string. The dual landing nipple arrangement permits a well to be equipped in advance to accommodate various pressure relationships so that the valve 135 is installable in either side pocket depending upon the normal relative pressures between the tubing strings. The valve 135 is always placed in the side pocket of the tubing string having the higher prevailing pressure. It will be evident that only one valve is used in the well system of FIG. 27 inasmuch as use of a valve 135 in both of the side pockets precludes the possibility of communicating the tubing strings with each other.

Figure 28:
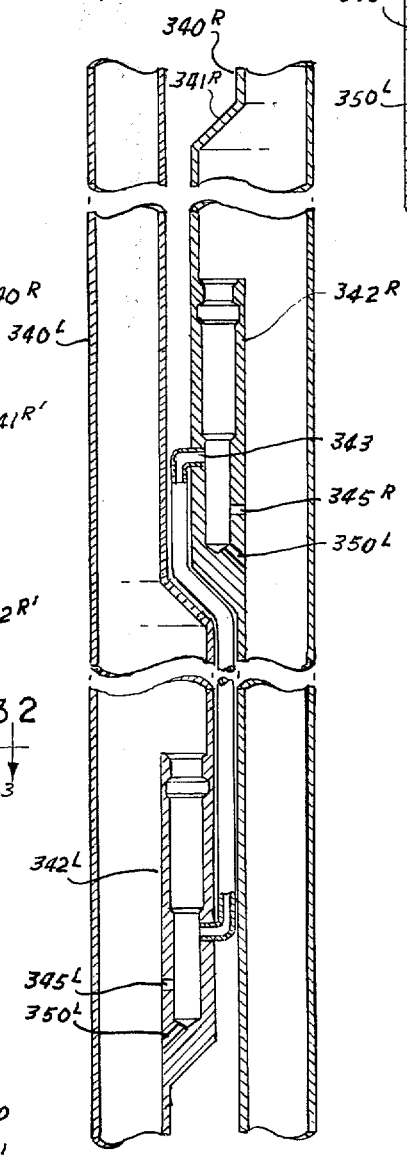
FIG. 28 is a broken fragmentary longitudinal view in section of an over-under arrangement of interconnected side-pocket type landing nipples in adjacent tubing strings.

The well arrangement shown in FIG. 28 is functionally identical to the arrangement of FIG. 27 and thus the same reference numerals are employed in FIG. 28. The tubing strings 340L and 340R are arranged with the side pockets 341L and 341R in a nested over-under relationship to conserve well diameter space. The cross-over passage 343 is defined by a length of tubing 361 interconnecting the side pockets of the landing nipples and diposed along the landing nipples and portions of the tubing strings in a suitable location to minimize the space requirements. The tubing string sections including the landing nipples preferably are secured together in some suitable manner, not illustrated, so that the tubing section and landing nipples are installed in the well as a unit to prevent possibly pulling the landing nipples apart at the tubing connection 361. A valve 135 is lockable in either of the side pockets and the system functions in exactly the same manner as the system shown in FIG. 27 with circulation being established between the tubing strings through the cross-over tubing 361 and the valve being opened by a pressure relationship in which the pressure in the tubing string including the valve is below the pressure in the other tubing string.

Figure 30:
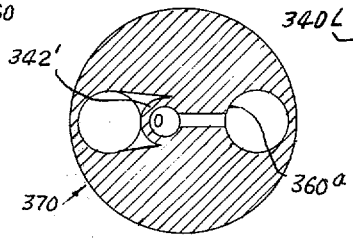
FIG. 30 is a view in section along the line 30—30 of FIG. 29.
Figure 29:
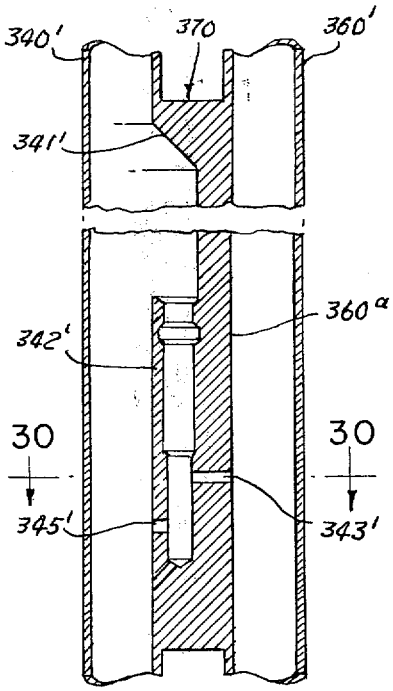
FIG. 29 is a broken fragmentary longitudinal view in section of a unitary body member having a side-pocket type landing nipple formed along one side and an interconnected longitudinal bore defining a flow passage along the other side for use with parallel tubing strings.

FIGS. 29 and 30 illustrate an integral side-pocket type landing nipple and cross-over unit 370 which is a space saving concept providing a function identical to that of the well arrangement of FIG. 26. The same reference numerals are used as those in FIG. 26 with the addition of a prime mark (′) to identify functionally identical features. The unit 370 has a vertical flow passage 360a which communicates with the tubing string 360′ and a laterally spaced side-pocket landing nipple portion 341′. The unit may be either machined from a solid block or suitably constructed from several pieces of material by any suitable manufacturing procedure. The unit is connected with the tubing string 340′ and 360′ by either threaded or welded connections, not shown. A valve 135 may be installed in the side pocket 342′ with the well system including the unit then functioning in exactly the same manner as that system shown in FIG. 26. The principal advantages of the unit 370 reside in the possibility of a more compact system together with some increased rigidity to aid in handling the unit in installing it in and retrieving it from a well.

Referring to FIGS. 31 and 32, a dual side-pocket unit 380 is shown for use with a pair of tubing strings 340L and 340R to which the unit 380 is suitably secured as by welding or threaded coupling, not shown. The unit 380 provides a space saving arrangement for discharging the identical dual side-pocket functions of the systems of FIGS. 27 and 28. The same reference numerals for identifying identical functional characteristics of the unit 380 are used as shown in FIGS. 27 and 28, with the addition of a prime mark (′). The compactness of the unit 380 is best appreciated from FIG. 32 showing the side-by-side arrangement of both side-pocket type landing nipples with the side pockets interconnected through the cross-over passage 343′. A valve 135 may be installed in either of the side pockets 342L′ or 342R′ for control of communication between the tubing strings through the cross-over passage 343′. The system with the unit 380 functions in exactly the same manner as the system shown in FIGS. 27 and 28 so that an adjustment in the pressure relationship between the tubing strings shifts the valve 135 to communicate the strings. As in all of the other systems shown, the valve 135 is placed in the normally higher pressure side pocket so that it remains at the upper position of FIG. 26 isolating the two tubing strings until the pressure relationship is changed to establish a higher pressure in the normally lower pressure tubing strings for shifting the valve downwardly to the lower end position to communicate the tubing strings. The unit 380 provides a rugged, easily handled single unit for dual side pocket installation.

It will now be understood from the foregoing descriptions of well systems embodying the invention that in its broadest concept the invention comprises a well system in which a fluid-responsive valve is disposed in a first flow passage defined in a well for communicating the first flow passage with a second flow passage in the well at one valve position and for isolating the two flow passages at another valve position, such valves being operable responsive to a pressure differential between the flow passages, the flow passage exterior of the one including the valve having the higher of the pressures providing the differential across the valve. In a major number of the forms of the invention shown the valve isolates the lower portion of the first flow passage in which it is disposed below the valve while communicating the second flow passage and the upper portion of the first flow passage above the valve. It will be further recognized that in each of the forms of the invention shown the valve may be installed and removed by standard wireline methods. If the well is properly equipped, the valve may be installed and removed using pump-down equipment and techniques as discussed and illustrated at pages 3,943–3,954 of the Composite Catalog of Oilfield Equipment and Services, 1970–71 Edition. The various well installations encompassed by the invention permit a multiplicity of well servicing procedures to be practiced in a well involving the pumping of fluids between the various flow passages defined in the well system while protecting the producing formations communicating with the flow passages from damaging effects of the fluids and pressures used in the well servicing procedures.

What is claimed and desired to be secured by Letters Patent is:

1. A well system for producing and servicing a well comprising: means defining a plurality of flow passages in a well; means defining a cross-over connection between at least two of said flow passages; and valve means disposed in a first of said flow passages for controlling communication between at least two of said flow passages through said cross-over connection, said valve means isolating said two flow passages from each other at a first position of said valve means and communicating said two flow passages with each other at a second position of said valve means, said valve means being movable between said positions responsive only to a pressure [valve] *value* exterior of said first flow passage in excess of the pressure in said first flow passage, *said valve permitting flow in both directions through the cross-over connection while in said second position.*

2. A well system in accordance with claim 1 wherein said valve means at said second position isolates the portion of said first flow passage below said valve means from the remainder of said flow passages while communicating at least said two flow passages.

3. A well system in accordance with claim 2 wherein the fluid pressure in said first flow passage during normal well production at said first position of said valve means is higher than the pressure exterior of said first passage, a relative increase in which moves said valve means to said second position.

4. A well system in accordance with claim 2 wherein said first flow passage is defined by a flow conductor adapted to be supported in a well, and said valve means is disposed in said flow conductor at means including said cross-over connection to communicate said connection with said flow conductor when said valve means is at said second position and to isolate said flow onductor below said valve means from said connec-
ion when said valve means is at said first position.

5. A well system in accordance with claim 4 including landing nipple comprising a hollow body member paced within said flow conductor defining a bore in which said valve means is disposed, said cross-over onnection opening into said bore, means defining a alve seat in said body member for engagement by said alve means at said second position, and means defin-ng a port communicating said bore of said body mem-er with a space in said flow conductor around said ody member whereby fluid flows through said space rom below said valve means into said flow conductor bove said valve means when said valve means is at said irst position.

6. A well system in accordance with claim 2 wherein irst and second flow passages are defined by two flow onductors interconnected by said cross-over connec-ion, said flow conductors being isolated from the cas-ng annulus of said well, said valve means being en-aged in a first of said conductors defining said first low passage, said first conductor having a by-pass for low around said valve means when said valve means is t said first position between said by-pass and said ross-over connection and said by-pass permitting ommunication through said cross-over connection to aid second flow conductor from said first flow conduc-or above said valve means when said valve means is at aid second position, said valve means being movable rom said first to said second position by a pressure in aid second flow conductor higher than the pressure in aid first flow conductor.

7. A well system in accordance with claim 2 wherein irst and second flow passages are defined by first and econd flow conductors and a third flow passage is de-fined by the casing annulus in said well around said low conductors, said cross-over connection interconnecting said first and second flow conductors port means provided in said first conductors spaced above said cross-over connection communicating with said third flow passage, a by-pass line connected at opposite ends at spaced locations into said first flow conductor, the lower end of said by-pass line connecting into said first flow conductor at a location spaced below said cross-over connection, said valve means being disposed in said first flow conductor at a location permitting fluid flow around said valve means from below said valve means to above said valve means through said by-pass line when said valve means is at a first position, said valve means including an upper valve member disposed and movable between said cross-over connection and said port to said third flow passage whereby said third flow passage is isolated at all times from said cross-over connection and said valve member is responsive to pressure in said third flow passage, and said valve means includes a second valve member movable with said first valve member and disposed at said first position of said valve means between said cross-over connection and said lower end of said by-pass line into said first flow conductor whereby said flow conductors are isolated from each other at said first position of said valve means, said second valve member moving at the said second position of said valve means to a position below said connection of said lower end of said by-pass line into said first flow conductor for communicating said first and second flow conductors with each other while isolating the lower portion of said first flow conductor below said valve means.

8. A well system in accordance with claim 2 wherein first and second flow passages are defined by flow conductors in said well and a third flow passages is defined by a well annulus around said flow conductors, said cross-over connection interconnecting said first and second conductors, said first conductor having a port spaced above said cross-over connection communicating said conductor with said third flow passage, said valve means being disposed in said first flow conductor, said first flow conductor having a by-pass line connected at an upper end into said flow conductor above said valve means and at a lower end into said flow conductor below said cross-over connection, said valve means having spaced first and second valve members, at said first position of said valve means said first valve member being disposed between said port to said third flow passage and said cross-over connection and said second valve member being disposed between said cross-over connection and the connection of said lower end of said by-pass line into said first flow conductor whereby said first and second flow conductors are isolated each from the other and said third flow passage is isolated from both of said flow conductors, said valve means being movable to said second position at which said first valve member is disposed between said cross-over connection and said connection of said lower end of said by-pass line into said first flow conductor and said second valve member is disposed in said first flow conductor below said connection of said lower end of said by-pass line to said flow conductor whereby said third flow passage and said second flow conductor communicate with each other through said cross-over connection and said side port in said first flow conductor, said lower portion of said first flow conductor is isolated from the upper portion of said conductor, and said upper portion of said first flow conductor is isolated from said second flow conductor, said valve being movable to said second position responsive to a pressure in said third flow passage in excess of the pressure in said first flow conductor.

9. A well system in accordance with claim 2 wherein first and second flow passages are defined by first and second flow conductors and said cross-over connection interconnects said conductors, said first conductor having a port spaced above said cross-over connection communicating with a third flow passage defined in said well around said flow conductors, said valve means being disposed in said first flow conductor, a by-pass line along said first flow conductor around said valve means connected at an upper end to said first flow conductor above said valve means and at a lower end below said cross-over connection, said valve means including a movable valve member for isolating said first and second flow conductors from each other and from said third flow passage at a first valve position while allowing upward flow along said first flow conductor and said by-pass line, and said valve member at a second position communicating said second flow conductor with said third flow passage through said cross-over connection while isolating upper and lower portions of said first flow conductor from each other and from said second flow conductor and said third flow passage, said valve member being movable to said second position responsive to a pressure in said third flow passage in excess of the pressure in said first flow conductor.

10. A well system in accordance with claim 2 wherein first and second flow passages are defined by first and second flow conductors and said cross-over connection interconnects said flow conductors, a third flow passage is defined by the annular space in said well around said flow conductors, said first flow conductor having a side port spaced above said cross-over connection communicating with said third flow passage, said valve means being disposed in said first flow conductor, a by-pass line connected along said first flow conductor around said valve means, the upper end of said by-pass line being connected into said first flow conductor above said valve means and the lower end of said by-pass line being connected into said first flow conductor at a location spaced below said cross-over connection, said valve means including a valve member having means at a first position for isolating said first and second flow conductors from each other and from said third flow passage while permitting flow along said first conductor and by-pass line, said valve member having means at a second position communicating said third flow passage with the portion of said first flow conductor above said valve means while isolating the portion of said first flow conductor below said valve means and isolating said second flow conductor from said first conductor and said third flow passage, said valve member being movable to said second position responsive to a pressure in said third flow passage in excess of the pressure in said first conductor.

11. A well system in accordance with claim 2 wherein said first and second flow passages are defined by first and second flow conductors interconnected by said cross-over connection and a third flow passage is defined by the annular space around said flow conductors, said first flow conductor having a side port above said cross-over connection communicating with said third flow passage, said valve means being disposed in said first flow conductor at said cross-over connection, a by-pass line connected into said first flow conductor, the upper end of said by-pass line being connected into said conductor above said valve means, and the lower end of said by-pass line being connected into said conductor at a location spaced below said cross-over connection, said valve means including a valve member movable in said flow conductor and having means for isolating said first and second flow conductors and said third flow passage from each other at a first position while permitting flow along said first conductor and by-pass line, and at a second valve member position for communicating said first conductor above said valve means with said second flow conductor through said cross-over connection while isolating said third flow passage and said first conductor below said valve means, said valve member being movable to said second position responsive to a pressure in said third flow passage in excess of the pressure in said first flow passage.

12. A well system in accordance with claim 2 wherein first and second flow passages are defined by first and second flow conductors interconnected by said cross-over connection and a third flow passage is defined by an annular space in said well around said flow conductors, said first flow conductor having a port spaced above said cross-over connection communicating with said third flow passage, said valve means being disposed in said first flow conductor, a by-pass line connected into said first flow conductor from above said valve means to a location spaced below said cross-over connection, said valve means including a valve member having means for isolating said first and second flow conductors and said third flow passage from each other while permitting flow along said first conductor and by-pass line at a first valve member position and at a second valve member position isolating a lower portion of said first conductor below said valve means while communicating said flow conductor above said valve means with said third flow passage and with said second flow conductor through said cross-over connection, said valve member being movable to said second position responsive to a pressure in said first flow passage below the pressure in said third flow passage.

13. A well system in accordance with claim 2 wherein said first and second flow passages are defined by first and second flow conductors and said cross-over connection connects said conductors, means for supporting a valve in said first conductor at said cross-over connection, said valve being movable between a first position at which said first and second flow conductors are isolated from each other and a second position at which said first conductor above said valve is communicated with said second flow conductor and the portion of said first conductor below said valve is isolated, and a valve in said second flow conductor at said cross-over connection movable between a first position at which said flow conductors communicate through said cross-over connection and a second position at which said flow conductors are isolated from each other at said cross-over connection.

14. A well system in accordance with claim 13 wherein said valve in said second flow conductor is a sliding sleeve valve.

15. A well system in accordance with claim 2 including means defining first and second flow passages comprising first and second flow conductors interconnected by said cross-over connection, said valve means being releasably lockable in either of said flow conductors at said cross-over connection, a by-pass line connected into each of said flow conductors from above said valve means to a location spaced below said cross-over connection, said valve means having a valve member disposed at a first position between said cross-over connection and the connection of the lower end of the by-pass line into the flow conductor in which said valve means is locked whereby at said first position of said valve member said first and second flow conductors are isolated from each other, and said valve member being movable to a second position responsive to a pressure in the other flow conductor in excess of the pressure in the flow conductor in which said valve means is locked, said valve member isolating the lower portion of the flow conductor in which said valve means is locked and communicating the upper portion of such flow conductor with the other flow conductor through said cross-over connection.

16. A well system for producing and servicing a well comprising: means defining a plurality of flow passages in said well for well fluids and service fluids flow; means for cross flow between at least two of said flow passages; and means for supporting a valve in a first of said flow passages for selectively isolating and communicating said two passages connected with said cross-flow means *for flow in both directions* responsive only to a pressure exterior of said first flow passage in excess of the pressure in said first flow passage.

17. A well system in accordance with claim 16 including a flow control valve in said valve supporting means, said valve being movable between a first valve position at which said two flow passages communicatable through said cross flow passage are isolated from each other and a second valve member position at which said two flow passages communicate with each other, said valve being movable between said positions responsive to a pressure differential across said valve means between said first flow passage and one of said flow passages other than said first flow passage.

18. A well system in accordance with claim 16 wherein said two flow passages connected with said means for cross flow are defined by first and second flow conductors, said first flow conductor having a side-pocket landing nipple having a side pocket for said valve and communicating with said means for cross flow.

19. A well system in accordance with claim 18 wherein said second flow conductor includes a side-pocket type landing nipple, and the side pockets of both of said landing nipples communicate through said means for cross flow.

20. A well system in accordance with claim 19 wherein said landing nipples are longitudinally aligned with each other.

21. A well system in accordance with claim 19 wherein said landing nipples are displaced longitudinally from each other and nested together in an over-under relationship, and said means for cross flow is defined by conduit means extending longitudinally between side ports in said side pockets of said landing nipples.

22. A well system in accordance with claim 16 wherein said two flow passages are defined in an integral unit for connection with first and second flow conductors, one side of said unit having a longitudinally extending side-pocket type landing nipple and the other side of said unit having a longitudinal flow passage, and said unit having said means for cross flow connecting the side pocket of said landing nipple and said longitudinal flow passage.

23. A well system in accordance with claim 16 wherein said two flow passages are defined in an integral unit having side-by-side side-pocket type landing nipples formed therein, the side pockets of said nipples communicating through said means for cross flow whereby said valve is positionable in either of said side pockets for controlling flow between said landing nipples.

*24. A duplex mandrel for a crossover system for use in a dual string of well tubing comprising, a pair of mandrels, each of said mandrels adapted to be connected in one of the well tubings, each of the mandrels including an open bore therethrough and a pocket for flow control devices offset from the bore, said mandrels being connected together, and a fluid conduit extending between the pockets.*

*25. A duplex mandrel for a crossover system for use in a dual string of well tubing comprising, a pair of mandrels, each of said mandrels adapted to be connected in one of the well tubings, each of the mandrels including an open bore therethrough aligned with the connected well tubing, and including a sidepocket offset from the open bore, said mandrels being connected together with the open bores being positioned side by side and the side pockets being positioned side by side, and a fluid conduit extending between the side-pockets.*

* * * * *